(12) United States Patent
Campbell et al.

(10) Patent No.: US 6,971,099 B1
(45) Date of Patent: Nov. 29, 2005

(54) INTEGRATED CIRCUITS FOR MULTI-TASKING SUPPORT IN SINGLE OR MULTIPLE PROCESSOR NETWORKS

(75) Inventors: Eric R Campbell, Hertfordshire (GB); Hugo R Simpson, Hertfordshire (GB)

(73) Assignee: MBDA UK Limited, Hertfordshire (GB)

( * ) Notice: Subject to any disclaimer, the term of this patent is extended or adjusted under 35 U.S.C. 154(b) by 0 days.

(21) Appl. No.: 09/152,266

(22) Filed: Sep. 14, 1998

(30) Foreign Application Priority Data

Dec. 20, 1995 (GB) .................................. 9526009

(51) Int. Cl.$^7$ ................................................ G06F 9/46
(52) U.S. Cl. ...................... 718/102; 718/103; 718/105; 718/104; 710/244; 710/264; 710/266; 716/1; 716/17; 716/18
(58) Field of Search ................................ 709/102, 103, 709/105; 710/244, 264, 266; 718/102, 103, 718/105

(56) References Cited

U.S. PATENT DOCUMENTS

| | | | |
|---|---|---|---|
| 3,643,227 A | | 2/1972 | Smith et al. |
| 4,468,727 A | | 8/1984 | Carrison et al. |
| 4,796,178 A | * | 1/1989 | Jennings et al. ............ 709/103 |
| 4,905,175 A | | 2/1990 | Corbett et al. |
| 4,964,040 A | | 10/1990 | Wilcox |
| 5,168,566 A | | 12/1992 | Kuki et al. |
| 5,265,203 A | | 11/1993 | Peaslee et al. |
| 5,469,549 A | * | 11/1995 | Simpson et al. ............ 709/213 |
| 5,487,170 A | * | 1/1996 | Bass et al. .................. 710/244 |

FOREIGN PATENT DOCUMENTS

| | | |
|---|---|---|
| EP | 0 155 371 | 9/1985 |
| EP | 0 250 011 A | 12/1987 |
| EP | 0 253 970 | 1/1988 |
| EP | 0 266 065 | 5/1988 |
| EP | 0 362 903 A | 4/1990 |
| EP | 0 364 000 A | 4/1990 |
| GB | 2 244 356 | 11/1991 |
| WO | WO 87/02486 | 4/1987 |
| WO | WO 91 16681 A | 10/1991 |

OTHER PUBLICATIONS

Perotto et al "An 8-bit Multitask Micropower RISC Core" Aug. 1994, IEEE Journal of Solid State Circuits, vol. 29 No. 8, pp. 986-991.*
IBM Technical Disclosure Bulletin, vol. 28, No. 5, Oct. 1985, New York US, pp. 1981-1985, XP002034326 "Procedure for Hierarchical Chip Physical Design" see the whole document.
IEICE Transactions on Electronics, vo. E76-C, No. 11, Nov. 1993, pp. 1641-1648, XP000424603 Nobutar Shibata et al.: "High-Performance Memory Macrocells with Row and Column Sliceable Architecture" see abstract see p. 1652, left-hand column, line 23; figures 1,2.

* cited by examiner

Primary Examiner—Anthony Knight
Assistant Examiner—Thomas Pham
(74) Attorney, Agent, or Firm—Nixon & Vanderhye P.C.

(57) ABSTRACT

An integrated circuit (7A) for multitasking support for processing unit (1A) holds control variables for each task (or activity) to run on its associated processor (1A) and identifies the next task that should run. The circuit (7A) employs level-driven, clock free ripple logic and is configured as a two dimensional array of "tiles", each tile being composed of simple logic gates and performing a dedicated function. The circuit has particular application to asynchronous multiple processor networks.

53 Claims, 19 Drawing Sheets

Array Tile_S

Array Tile_U

Array Tile_P

Array Tile_E

Array Tile_R

Array Tile_M

Array Tile_A

Array Tile_N

Array Tile_Stop

Array Tile_Utop

Array Tile_Ptop

Array Tile_Etop

Array Tile_Rtop

Array Tile_Mtop

Array Tile_Atop

Array Tile_Ntop

Customising Tile_P and Tile_E

INTEGRATED CIRCUITS FOR MULTI-TASKING SUPPORT IN SINGLE OR MULTIPLE PROCESSOR NETWORKS

BACKGROUND OF THE INVENTION

1. Field of the Invention

This invention relates to integrated circuits and particularly, though not exclusively to integrated circuits for use in single or multi-processor systems.

2. Discussion of Prior Art

One object of the invention is to provide an integrated circuit, (to be referred to herein as a "Butler Chip") which is capable of directly supporting the shared data and multi-tasking concepts of real-time networks in the context of single or multi-processor systems.

A further object is to provide a more deterministic (in the temporal sense) execution environment so as to eliminate some aspects of pessimistic timing analysis at the fundamental level of computer operation.

For a better understanding of an application of the "Butler Chip" to be described herebelow, reference is made to our co-pending Patent Application WO91/16681 (now U.S. Pat. No. 5,469,549). Therein, two Central Processing Units (CPU) are able to interact through an Asynchronous Dual Port Memory (ADPM). The ADPM can carry many communications routes (spatially multiplexed) such that there is no temporal interference between these routes, and where the temporal interaction between operations at the two sides of the same route is confined entirely to that interaction which is implicit in the protocol which characterises the dynamic of the route.

The latter property is dependent upon the fact that the ADPM has two completely independent access paths to every memory element and itself applies no exclusion.

Support for the protocols of the multi-processor communications systems of WO91/16681 is provided by a Communications Executive Chip (CEC) which contains logic for many parallel routes of various types. Support for scheduling is provided by a Kernel Executive Chip (KEC) which contains the logic for controlling 64 activities organised in 8 priority levels with 8 activities in each level. Selection at each level is controlled by a round robin polling logic. The highest priority level can be stimulated from external devices, including the set of CECs associated with a CPU.

Both the CEC and the KEC are accessed as memory attached to a private bus of each CPU, with individual chip functions being associated with particular access addresses. This allows the KEC's and CEC's to be used with any type of processor.

A particular feature of the approach to the implementation of routes between activities in adjacent processors, concerns the way in which implicit stimuli are handled. A CEC can multiplex a number (eg 32) of stims (termed secondary stims) and can indicate to the KEC (by means of a "primary stim" that a secondary stim is present. It is therefore necessary to use software to unpack and distribute the secondary stims. In WO91/16681, this has to be effected by infrastructure software containing stim servers. Disadvantageously, this arrangement introduces temporal indeterminacy because the stim servers run and impede the progress of application level activities.

SUMMARY OF THE INVENTION

The "Butler chips" proposed in the present invention can fulfil the role of the KEC and also absorb CEC functions where feasible. One advantage of using the "Butler chip" in the above context is the removal of the aforementioned temporal indeterminacy by eliminating the need for stim servers. It also facilitates a more flexible priority and poll set scheme.

In one aspect of the invention, an integrated circuit for use as a schedule of activities to be run on an associated CPU, is configured to support a "control node" mechanism by incorporating means for holding at least one pair of control variables comprising a "stim-wait" channel and corresponding to each of said activities, and further incorporating next activity selection logic for identifying those activities which are ready for running on the CPU, depending on the status of said control variables.

The "Butler chip" may be used in association with kernel primitive and builder operations. The "kernel" is software running on the associated CPU which switches in and out the tasks/activities to be performed by the CPU. The "Butler chip" supports the kernel.

The "stim-wait" channels allow an activity to selectively wait and be selectively stimmed. Each of these stim-wait channels supports to a control node in software. A control node is introduced to provide a control point at which an activity may wait to be "stimmed" into operation by another activity.

The provision of multiple stim-wait channels allows each activity to put itself into a condition where it selectively waits for stimuli from a plurality of sources eg. from its associated CPU, a peripheral device or from another "Butler chip".

In addition to the stim-wait channels, each activity may have associated with it, other control variables to be described in detail here below.

In another aspect, an integrated circuit for use as a scheduler of activities to be run on an associated CPU is of modular structure being constructed from an assembly of "tiles", wherein each tile defines a building block having logic and structure, said tiles being abutted one against the other to form a two-dimensional array of n rows and m columns which realises an overall functionality for the integrated circuit and wherein each of the n rows of tiles provides the control logic for each one of n schedulable activities and each of the m columns of tiles provides a particular function.

The control logic includes means for holding control variables corresponding to each activity. Some of these control variables may comprise at least one stim-wait channel.

A top row of tiles may be added to provide the interfacing circuitry to external devices, such as a CPU.

The word "tile" in this context means a design building block which when butted to other tiles to form a two dimensional array, encapsulates the electronic circuitry and structural information needed for realising overall functionality and direct physical silicon layout.

Thus the "Butler chip" of the present invention is provided with a physical construction that combines simple logic elements with defined interfaces into a regular structure in order to achieve the required functionality.

As all the necessary signal connections are automatically made when the tiles are abutted, there is no requirement for any additional inter-tile routing.

In contrast to conventional clock-driven logic, the "Butler chip" of the present invention uses level-driven, clock-free ripple logic. Asynchronous operation is used with the "Butler chip" responding to events: eg instructions from an associated local processor or asynchronous stimuli from external sources. Such "external sources" could comprise local peripherals or even other processor's associated "Butler chips". By virtue of the structural design of the "Butler chip"; following an event, the internal logic freely ripples to establish its final stable condition. Where memory elements are required, non-clocked latches are used.

The invention offers many advantages. The design can be easily implemented in different technologies because it is not dependent on critical timing parameters. There are no clock signals to distribute and consequently no clock-skew or set-up and hold violation problems. All of the circuitry is related to the application, using minimum circuitry per function. Furthermore, the asynchronous circuitry has non-demanding power-supply requirements particularly if CMOS technology is employed. The chip design can be analysed for correctness by formal mathematical methods and manufactured devices may be tested, in isolation, to achieve full fault coverage.

The "Butler chip" is particularly suited to hard, real-time embedded systems and to systems that need to demonstrate quantifiable levels of dependability.

It can be used with any type of processor. For example, it can provide support for multi-tasking in a single or multiple processor system. Specifically, it is used to hold control variables for each task or activity assigned to run on an associated processor and to identify the next task that should run. These control variables can be set at any time from different sources. The logic for selecting the next task can be programmed (ie via software). Tasks that are given the same priority level can be selected by the "Butler chip" on a round robin basis within their group. Asynchronous stimuli (eg interrupts from local peripherals) can be handled directly by the "Butler chip" which schedules the relevant task when its turn arrives, according to the programmed priority level selection. Co-operative and pre-emptive scheduling schemes can be supported.

In the example of a multiprocessor system, each processor has its own associated "Butler chip" and connections are made between "Butler chips". A request for scheduling any task is always registered with a processor's own "Butler chip". Where the task resides on a different processor, "Butler chips" communicate directly and schedule the relevant task on the destination processor when its turn arrives. This avoids the need to unnecessarily interrupt any task running on the destination processor, thereby providing an efficient, temporally deterministic operation.

Some embodiments of the invention will now be described, by way of example only, with reference to the drawings of which:

DETAILED DISCUSSION OF EMBODIMENTS

Figure 1:
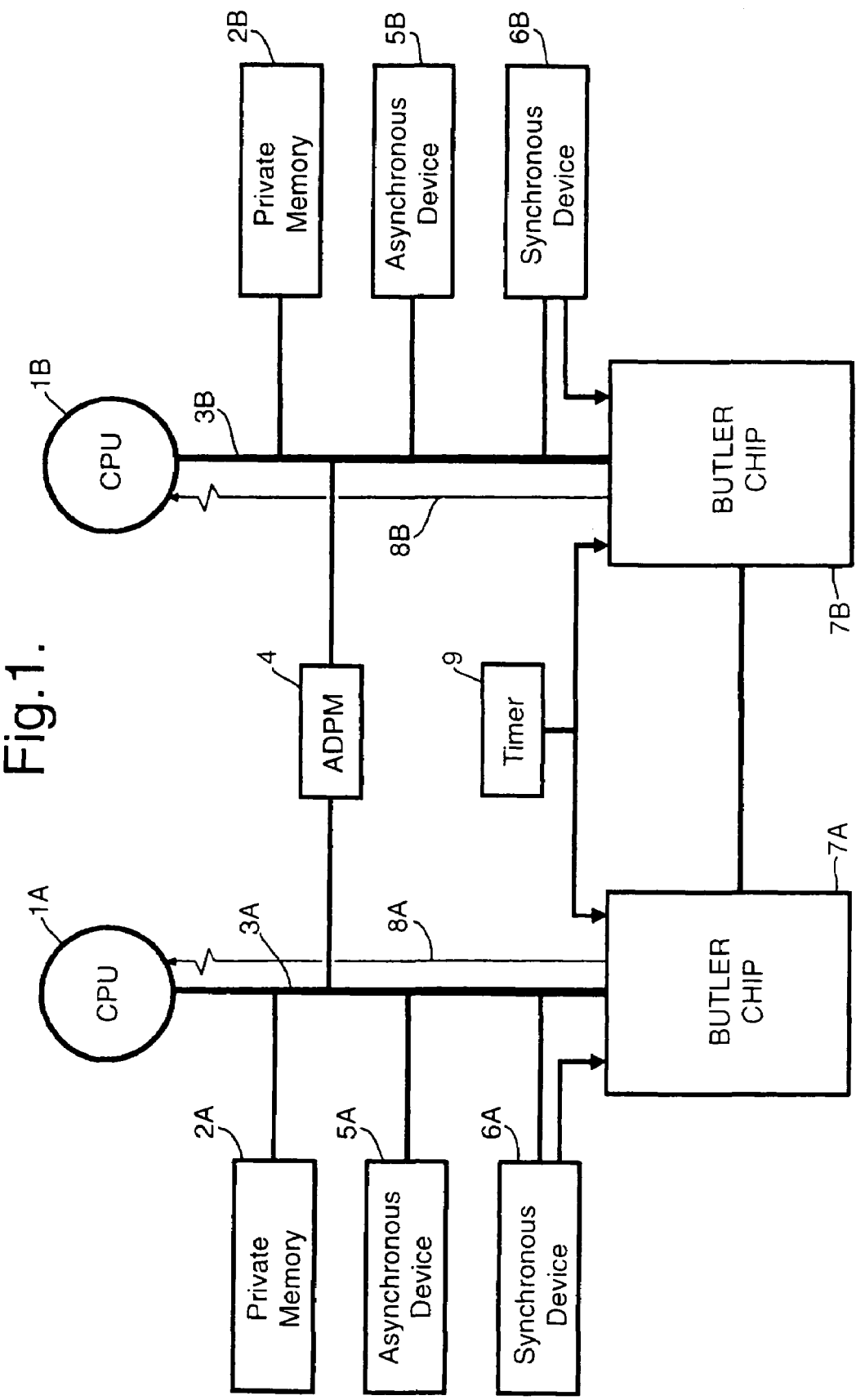
FIG. 1 is a schematic circuit diagram illustrating the use of the "Butler chip" in accordance with the invention in a multiprocessor network.

In FIG. 1 a dual processor system comprises two central processing units (CPU) 1A, 1B, each CPU being linked to a private memory 2A, 2B via a data bus 3A, 3B. The CPU's 1A, 1B are linked to each other by means of an asynchronous dual port memory (ADPM) 4. Each CPU 1A, 1B also has access to asynchronous devices (peripherals) 5A, 5B, synchronous devices (ie peripherals which can generate an external stimulus) 6A, 6B and an associated "Butler chip" 7A, 7B respectively. The "Butler chips" 7A, 7B are connected with one another.

An interrupt line 8A, 8B, runs from each "Butler chip" 7A, 7B to its associated CPU 1A, 1B. This can be used to trigger task switching when using pre-emptive scheduling or to indicate a watch-dog timer overrun when using co-operative scheduling.

Each "Butler chip" may be provided with a standard memory interface for connection to its associated processor. Conveniently, this could comprise a 16-bit bi-directional data bus, three address lines and three memory control line inputs.

A preferred example is provided with active-low asynchronous local inputs for use by peripherals. Each may register a request for service at any time. Additionally, there are four groups of asynchronous external inputs. In a multiple processor system these would be connected to other processor's associated "Butler chips". Each group has six lines that are used to identify a specific task number, and an associated active-low stimulus input that registers a request for service. Ten outputs are provided for connection to the external inputs of up to four other "Butler chips". Six are used to identify a specific task number and are connected to all adjacent "Butler chips". The other four outputs are the active-low stimulus outputs, each connected to a different processors "Butler chip".

One further input line is provided; to the "Butler chip's" internal counter, either from the CPU's clock or from an external timer 9.

The structure of a "Butler chip" (7A or 7B of FIG. 1) will now be described with reference to FIG. 2.

As mentioned above, a "Butler chip" comprises a two-dimensional array of tiles. Each tile consists of a plurality of interconnected logic gates and input/output connections for interfacing with adjacent tiles. Each tile type fulfils a particular function.

In the specific example to follow, a "Butler chip" array 10 is comprised of a main array 11 of 1312 tiles and a top row 12 of a further 21 tiles.

Figure 2:
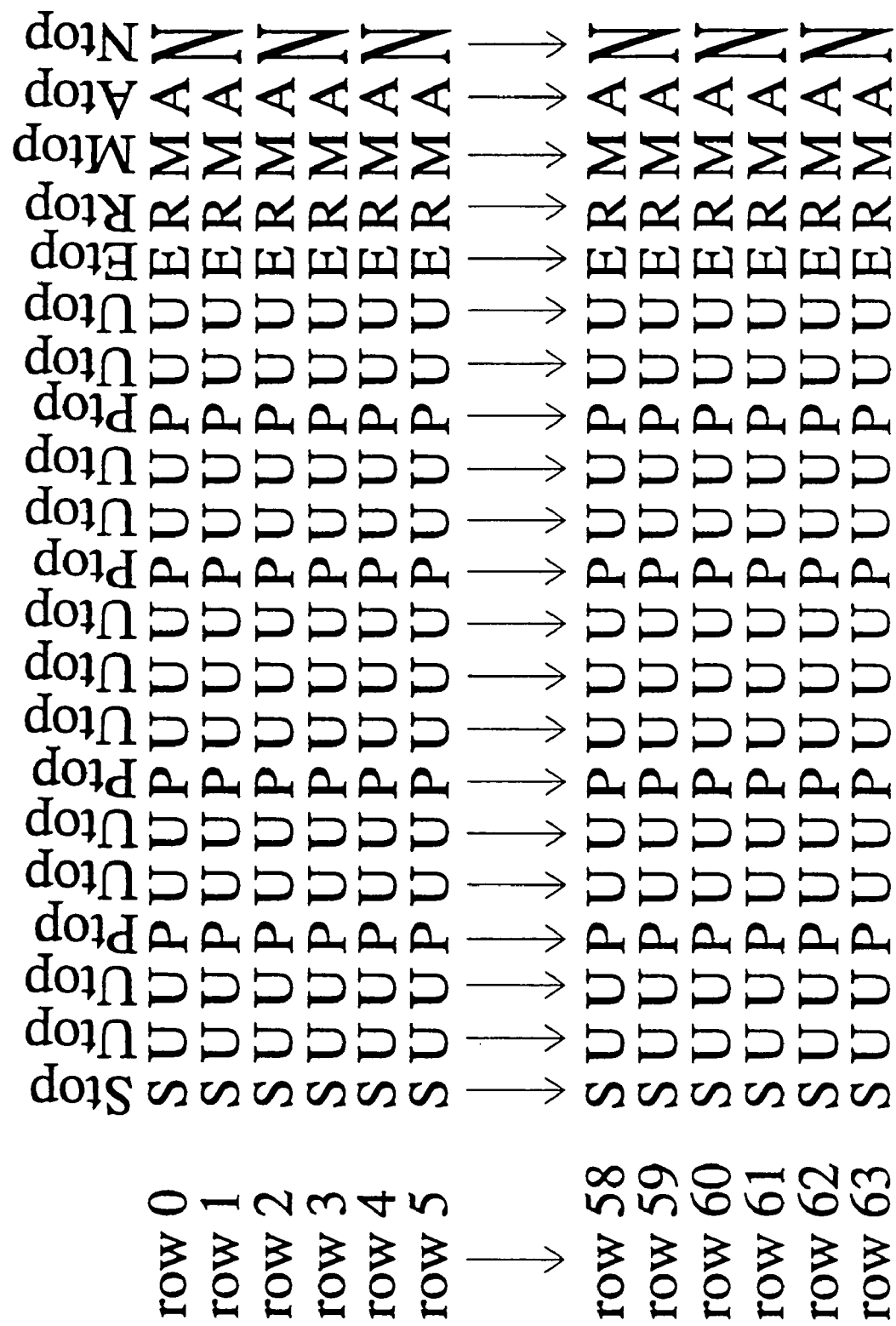
FIG. 2 is a diagram showing the layout of the different types of tile which comprise a "Butler chip" array which is suitable for use with the network of FIG. 1.

There are eight different tile types, represented in FIG. 2 by the letters S, U, P, E, R, M, A, N. Each tile comprises a few simple logic gates.

The main array 11 has sixty-four rows that each hold the control variables for an activity. Row 0 is associated with activity zero, with activity numbers incrementing for the remaining rows 1 to 63 down the array.

Each row of the main array 11 contains twenty and a half tiles (Tile N is a double height tile that spans two rows). From left to right these are:

| one | tile  | of | type Tile_S |
| two | tiles | of | type Tile_U |
| one | tile  | of | type Tile_P |
| two | tiles | of | type Tile_U |
| one | tile  | of | type Tile_P |

-continued

| | | | |
|---|---|---|---|
| three | tiles | of | type Tile_U |
| one | tile | of | type Tile_P |
| two | tiles | of | type Tile_U |
| one | tile | of | type Tile_P |
| two | tiles | of | type Tile_U |
| one | tile | of | type Tile_E |
| one | tile | of | type Tile_R |
| one | tile | of | type Tile_M |
| one | tile | of | type Tile_A |
| half | tile | of | type Tile_N |

The circuitry of the top row 12 is designed to generate main array control signals and to interface with a CPU, and other "Butler Chips".

There are eight different tile types, each comprising a few simple gates. The row contains 21 tiles, one at the top of each column. From left to right these are:

| | | | |
|---|---|---|---|
| one | tile | of | type Tile_Stop |
| two | tiles | of | type Tile_Utop |
| one | tile | of | type Tile_Ptop |
| two | tiles | of | type Tile_Utop |
| one | tile | of | type Tile_Ptop |
| three | tiles | of | type Tile_Utop |
| one | tile | of | type Tile_Ptop |
| two | tiles | of | type Tile_Utop |
| one | tile | of | type Tile_Ptop |
| two | tiles | of | type Tile_Utop |
| one | tile | of | type Tile_Etop |
| one | tile | of | type Tile_Rtop |
| one | tile | of | type Tile_Mtop |
| one | tile | of | type Tile_Atop |
| one | tile | of | type Tile_Ntop |

In the following description of the preferred embodiments, meanings of certain terms used are listed below:

active-high A boolean variable whose true value is represented by a high and false value is represented by a low.

active-low A boolean variable whose true value is represented by a low and false value is represented by a high.

activity The number assigned to a software task that can be scheduled.

array The arrangement of tiles that form the main BUTLER structure.

array-operation An event initiated pulse that freely ripples along a logic chain in the array to set or reset a preselected srlatch.

clrall The array-operation where all (except 'Last') srlatches in the array are reset. Initiated by a Clear_All BUTLER instruction clrpollend The array-operation where the 'Pollend' srlatch is reset for an activity. Initiated by a Clear_Pollend BUTLER instruction to remove a pollset boundary.

clrstarted The array-operation where the 'Started' srlatch is reset for an activity. Initiated by a Clear_Started BUTLER instruction for an activity that is to be excluded from being scheduled.

established The final stable condition of a signal when any ripple logic transient effects have subsided.

high A positive voltage level.

latch An arrangement of gates used to form a memory element. Latches are given single-word names with an upper-case first letter, lower-case subsequent letters and are enclosed in single quotes (e.g. 'Latch'). Where reference is made to the boolean variable implemented by a single-bit latch, the latch name enclosed in double quotes is used (e.g. "Latch").

low A zero voltage level.

nextact The array-operation when the activity chosen to be the next for scheduling is being returned to the processor. Initiated by a Nextact BUTLER instruction.

pollset A contiguous group of activities designated to have equal priorities.

reset As a noun, the false state of a srlatch. As a verb, applying the make-false input to a srlatch.

set As a noun, the true state of a srlatch. As a verb, applying the make-true input to a srlatch.

setpollend The array-operation where the 'Pollend' srlatch is set for an activity. Initiated by a Set_Pollend BUTLER instruction to insert a pollset boundary.

setstarted The array-operation where the 'Started' srlatch is set for an activity. Initiated by a Set-Started BUTLER instruction for an activity that is allowed to be included as a candidate for being scheduled.

setstimmed The array-operation where the 'Stimmed' latch(es) are set for an activity'. Initiated by a Do_Stim BUTLER instruction.

setsuspended The array-operation where the 'Suspended' latch is set for an activity. Initiated by a Set-Suspended BUTLER instruction.

setwaiting The array-operation when the 'Waiting' srlatch(es) are set for the activity most recently returned to the processor for scheduling. Initiated by a Do-Wait BUTLER instruction (when the activity currently running on the processor co-operatively offers a reschedule point having finished its current work).

signal A physical line able to assume a high or low value. Active-high signals are given single-word names with an upper-case first letter and lower-case or numerical subsequent characters (e.g. Signal3). Active-low signal names are prefixed with an upper-case N (e.g. NSignal7). Where it is necessary to individually identify the two ends of a signal that forms a connection between tile rows, each end is postfixed with an A or B (e.g. Signal4B would be directly connected to Signal4A in the tile below). Where it is necessary to individually identify the two ends of a signal that forms a connection between tile columns, each end is postfixed with an L or R (e.g. Signal2L would be directly connected to Signal2R in the tile to the Left; Signal2R would be directly connected to Signal2L in the tile to the right).

srlatch A boolean latch with independent make-true and make-false inputs that may be applied at any time.

suspend The array-operation when the 'Suspended' srlatch is set for the activity most recently returned to the processor for scheduling. Initiated by a Suspend BUTLER instruction (when the activity currently running on the processor cooperatively offers a reschedule point but wishes to continue).

taken The active condition of a signal during an array-operation. (e.g. Signal3 is taken high during suspend).

tlatch A latch with a control signal that selects one of two modes of operation. Either the latch is transparent and its output tracks its input, or it is latched when its output retains the value it held when last transparent.

transmitted The value existing at one place is established at another.

value The high or low condition of a signal.

Operations of each "Butler chip" are carried out in response to memory writes or reads from its associated CPU, as shown in the table below.

| ADDRESS | | | | |
|---|---|---|---|---|
| A2 | A1 | A0 | "WRITE" INSTRUCTION | "READ" INSTRUCTION |
| 0 | 0 | 0 | Load_Mask [D15–D0] | Do_Stim |
| 0 | 0 | 1 | Load_Activity [D5–D0] | Do_Wait |
| 0 | 1 | 0 | Do_Stimx | Suspend |
| 0 | 1 | 1 | Clear_All | Set_Suspended |
| 1 | 0 | 0 | Clear_Started | Set_Started |
| 1 | 0 | 1 | Clear_Pollend | Set_Pollend |
| 1 | 1 | 0 | Load_Counter_Lo [D15–D0] | Nextact [D15–D0] |
| 1 | 1 | 1 | Load_Counter_Hi [D15–D0] | Control_Interrupts |

Writes to, and reads from a "Butler chip" are used to load operational data, return data to each CPU and to initiate internal "Butler chip" operations. To minimise the temporal constraints on the CPU interface, write accesses that are used to load operational data to a "Butler chip" do not initiate operations within the chip.

Writes to a "Butler chip" may be carried out by the associated CPU at any time.

Instructions Load_Mask, Load_Counter_Lo and Load_Counter_Hi use the values on all sixteen data lines (D15–D0). These enter the "Butler chip" via tiles N,S_top, U_top and P_top (labelled Datain and $D_{in}$ in the accompanying figures). The mask is an array of sixteen bits used to select one or more stim_wait channels as an argument for "Butler chip" operations.

Each activity/task to be scheduled has sixteen pairs of "stimmed" and "waiting" (control) variables, each pair being referred to as a "stim-wait" channel. Some instructions can operate on individual or groups of stim-wait channels. The "stim-wait" channels to be operated on are specified by including a logic "one" in an appropriate bit position in the data word of the "Load Mask" instruction.

The instruction Load_Activity uses only the values on the six data lines (D5–D0) which enter the "Butler chip" via tile E_top. No data line values are used by the other "write" instructions.

Reads from a "Butler chip" may be carried out by the CPU at any time. In general, read instructions will not return valid data to the CPU. Read instructions will return valid data on all sixteen data lines (D0–D15) in defined circumstances to be described below. During normal operation only data returned by a "Nextact" instruction is used (Nextact returns the number of the next activity to be scheduled to the CPU). "Nextact" will return valid data when the time from a preceding "Suspend" or "Do Wait" instruction is sufficient to have allowed the next activity selection logic to have stabilised.

Each "Butler chip" performs specified functions when accessed as memory. It is not intended for use where unintentional memory accesses may occur, such as in direct-memory-access, cache or refresh memory systems.

Each "Butler chip" holds the control variables for each activity assigned to run on its associated CPU. In the specific example, sixteen "stim-wait" channels are for internal use (ie interactions between a "Butler chip" 7A and its associated CPU 1A) these are held on the SU and P tiles. Four of the sixteen "stim-wait" channels are additionally for interactions from a neighbouring "Butler chip" 7B. These are held on the 'P' tiles. One of the sixteen "stim-wait" channels is additionally for interactions with the peripheral 6A. This is held on the S tile. The number of U and P tiles may be varied to suit the application or dispensed with altogether. Depending upon the values of these control variables and others as described herebelow, the "Butler chip" continuously computes the next activity to be scheduled, taking into account any currently programmed priority levels.

The "Butler chip" is designed to operate correctly in an asynchronous environment. The next activity selection logic operates continuously and can respond to multiple inputs that may arrive at any time from temporarily incoherent sources. The outputs from the next activity selection logic are put onto the least significant seven bits (D6–D0) of the data bus during all read instructions. Because a result may be in the process of being updated during a read operation, read instructions will not always return valid data.

During normal operation only the Nextact read instruction is required to return valid data. (The number of the next activity to be scheduled.) This is achieved by temporarily inhibiting any changes to the asynchronously stimulated variables from entering the next activity selection logic, and allowing time for the next activity selection logic to stabilise before executing a Nextact instruction. A preceding Suspend or Do_Wait instruction is used to inhibit visibility of any changes to the asynchronously stimulated variables from entering the next-activity-selection logic.

The maximum time for the next activity selection logic to stabilise in response to a change is determined by the ripple logic search chain. This worse case time also applies to all instructions that may alter the next activity selected, including "Stimmed", "Waiting", "Suspended", "Started" and "Pollend" variables (to be described below). The value of this time is implementation specific and is calculated by a summation of the worst case gate delays in the complete search logic chain.

A "Clear-All" instruction from the CPU disables interrupts, removes any pollset boundaries and initialises (i.e. makes false) the "started", the "suspended" and the sixteen "stimmed" and "waiting" control variables for all activities.

Some instructions operate on a specified activity number. This activity number is specified in the data word of a Load_Activity instruction and is held on the "Butler chip".

Activities (or tasks) are numbered from zero to sixty-four. When priority levels apply, smaller activity numbers have the higher priorities. Activity number sixty-four always has the lowest priority and can be used to schedule an idle activity at a time when no other activities are candidates for scheduling.

Following a "Clear All" instruction activities numbered zero to sixty-three are assigned equal priorities. Priority levels can be allocated to individual activities or to groups of activities, by inserting "pollset" boundaries.

A "Set Pollend" instruction will insert a pollset boundary. The activity specified in the most recent "Load Activity" instruction will then become the largest number in this pollset. (The following activity number will automatically become the smallest activity number in the next priority pollset). A "Clear Pollend" instruction will remove the pollset boundary (if it exists) at the activity number specified in the most recent "Load Activity" instruction. Pollset boundaries may be inserted or removed at any time.

Where more than one activity is a candidate for scheduling at any one time, the next activity selection logic will select an activity from the highest priority pollset that contains a candidate. If this pollset contains more than one candidate, selection is made on a round robin basis within the pollset, the search starting from the activity following the activity that was last returned for scheduling in that pollset.

An activity will only be included as a candidate for scheduling when it is started and ready:

A "Set Started" instruction will make the "started" control variable true for the activity specified in the most recent "Load Activity" instruction. A "Clear Started" instruction will make the "started" control variable false for the activity specified in the most recent "Load Activity" instruction. The "started" variable thus indicates whether or not an activity can be considered for scheduling.

An activity is ready when either its "suspended" variable is true, or it has a matched pair of true "stimmed" and "waiting" control variables.

A "Set Suspended" instruction will make the "suspended" variable true for the activity specified in the most recent "Load Activity" instruction. A "Suspend" instruction will make the "suspended" variable true for the activity currently running on the CPU (ie the last activity returned to the CPU for scheduling). The "suspended" variable will be made false when the activity is returned to the CPU as the next activity to be scheduled. A Suspend instruction allows an activity to suspend its operation and ensures that a request for continued operation is registered by means of the "suspended" variable. This instruction operates on the current activity whose activity number is remembered on the "Butler chip" as well as being passed back to the CPU.

A "Do Wait" instruction will make the "waiting" variable true for the stim-wait channel(s) specified in the most recent "Load Mask" instruction for the activity currently running on the CPU. The "waiting" variable will be made false when this activity is returned to the CPU as the next activity to be scheduled.

Both the Suspend and Do Wait instructions are always associated with the end of a processing slice and therefore always shortly precede the Nextact instruction which will notify the CPU of the next activity to be scheduled. For this reason and as described in greater detail below, the outputs associated with asynchronous stimuli are latched in order to temporarily prevent their onward propagation.

A "Do Stim" instruction will make the "stimmed" variable true for the stim-wait channel(s) specified in the most recent "Load Mask" instruction for the activity specified in the most recent "Load Activity" instruction. The "stimmed" variable will be made false when the activity is returned to the CPU as the next activity to be scheduled.

When an activity is selected for scheduling, the suspended and all its, stimmed and waiting variables are cleared to false.

When "Butler chips" are interconnected, each chip is able to make "stimmed" variables true in other chips. Certain stim-wait channels for one "Butler chip" can be associated with a stim-wait channel in another chip by physical connection. A "Do Stimx" instruction will make the associated "stimmed" variable in a connected chip true for the activity specified in the most recent "Load Activity" instruction.

Following a "Clear All" instruction the interrupt output line will be held in its non-active state (ie High) with interrupts disabled.

A "Control interrupts" instruction uses the least significant two bits of the activity number specified in the most recent "Load Activity" instruction (Actbit1 and Actbit0) to define its operation.

A "Control interrupts" instruction when Actbit1 is high will allow interrupts to be generated when the "Butler chip" detects that there is a candidate for scheduling with a higher priority than the activity currently running on the CPU. When this is the case, the interrupt output line will be held low. A "Do Wait" or a "Suspend" instruction will restore the interrupt line to its non-active state. A "Nextact" instruction will allow further interrupts to be generated. A "Control Interrupts" instruction when Actbit1 is low will prevent generation of these interrupts.

Each "Butler chip" has a 32-bit down-counter that counts low to high transitions on the counter input line. A "Do Wait" or a "Suspend" instruction initialises the counter to the 32-bit number that is held on the "Butler chip". A "Nextact" instruction enables the counter to start counting.

The 32-bit number that is used to initialise the counter is programmable. A "Load_Counter_Lo" instruction loads the data word into the least significant 16-bits of the number. A "Load_Counter_Hi" instruction loads the data word into the most significant 16-bits of the number.

A "Control Interrupts" instruction when Actbit0 is high will cause an interrupt to be generated when the "Butler chip" counter has received a programmed number (plus one) of signal transitions on its counter input line. When this is the case, the interrupt output line will be held low. A "Do Wait" or a "Suspend" instruction will restore the interrupt line to its non-active state. A "Nextact" instruction will allow further interrupts to be generated. A "Control Interrupts" instruction when Actbit0 is low will prevent generation of these interrupts.

The tiles of the main array 11 will now be described with reference to FIGS. 3–10.

Figure 3:
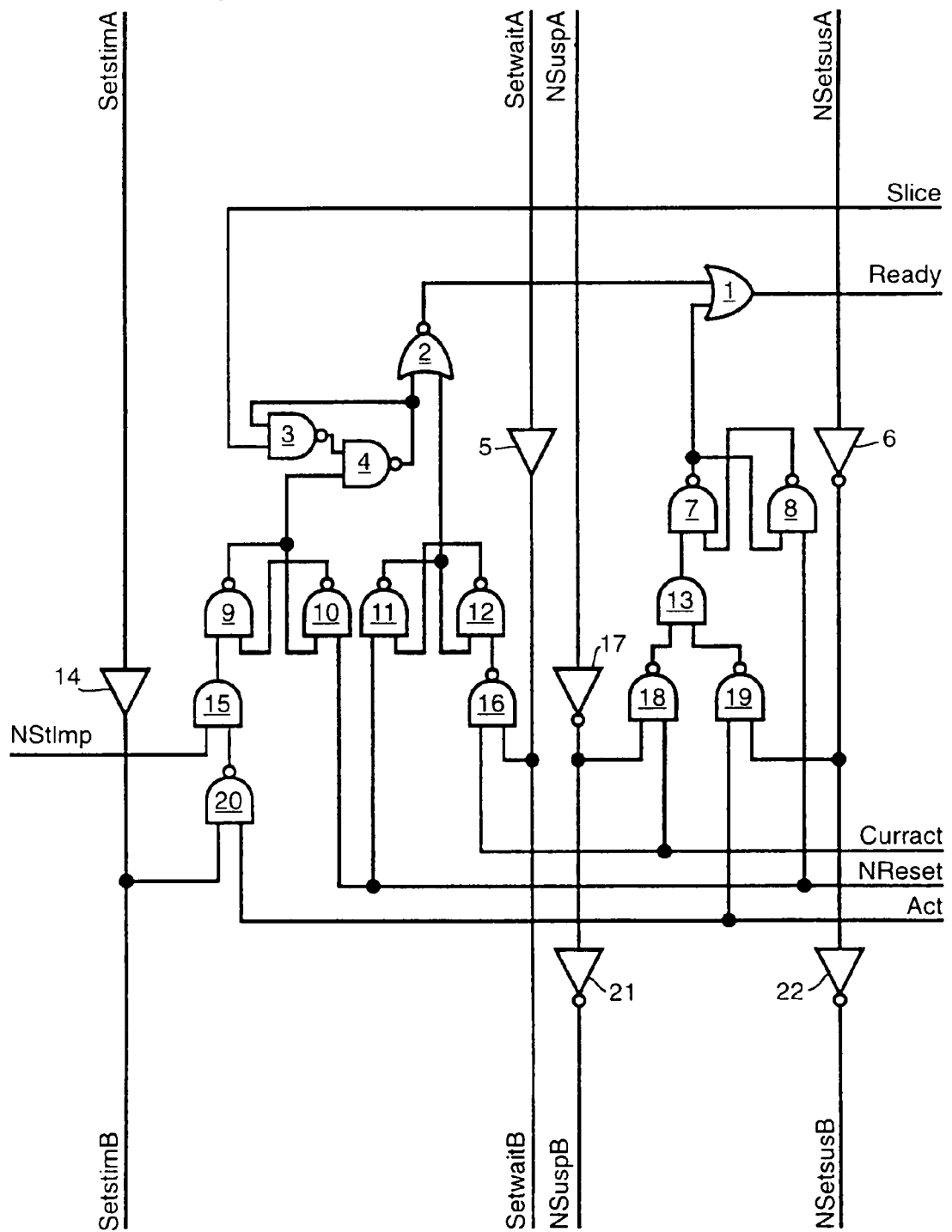
FIGS. 3–10 are logic circuit diagrams of the tiles comprising a "main array" of a "Butler chip"

The structure of tile type 'S' is shown in FIG. 3. The function of this tile is to hold an activity's "Suspended" and local "Stimmed" and "Waiting" Boolean variables and to indicate whenever either "Suspended" is true or both "Stimmed" and "Waiting" are true.

Outputs:
    Ready to Tile_U
    SetwaitB to Tile_S below
    SetstimB to Tile_S below
    NSuspB to Tile_S below
    NSetsusB to Tile_S below Inputs:
    SetwaitA from Tile_S above
    SetstimA from Tile_S above
    NSuspA from Tile_S above
    NSetsusA from Tile_S above
    Slice from Tile_U
    Curract from Tile_U
    NReset from Tile_U
    Act from Tile_U
    NStimp from BUTLER I/O input The operation of tile type 'S' is as follows: Cross-coupled gates 7 and 8 form a srlatch. This 'Suspended' latch is set via gates 13,17 and 18 when NSuspA is low and Curract is high, or via gates 6, 13 and 19 when NSetsusA is low and Act is high. (NSuspA is taken low during suspend; Curract is high when this was the last activity returned to a CPU for scheduling; NSetsusA is taken low during setsuspended; Act will be high whenever this activity was chosen by the most recent Load_Activity instruction.) The 'Suspended' latch is reset when NReset is low. (NReset is taken low during clrall or during nextact when this activity is being returned to the CPU.) Concurrent set and reset of the 'Suspended' latch cannot occur because NSuspA, NSetsusA and NReset are taken low, only while executing different instructions.

Cross-coupled gates 11 and 12 form a srlatch. This 'Waiting' latch is set via gates 5 and 16 when SetwaitA and Curract are high. SetwaitA is taken high during setwaiting if this stim-wait channel mask-bit was set in the most recent Load_Mask instruction. Curract is high when this was the last activity returned to the CPU for scheduling. The 'Waiting' latch is reset when NReset is low. (NReset is taken low during clrall or during nextact when this activity is being returned to the CPU.) Concurrent set and reset of the 'Waiting' latch cannot occur because SetwaitA is taken high and NReset is taken low, only while executing different instructions.

Cross coupled gates 9 and 10 form a srlatch. This 'Stimmed' latch is set via gate 15 when NStimp is low, or via gates 14, 15 and 20 when SetstimA and Act are high. (NStimp is an input from a local peripheral; SetstimA is taken high during setstimmed if this stim-wait channel mask-bit was set in the most recent Load_Mask instruction; Act will be high whenever this activity was chosen by the most recent Load_Activity instruction.) The 'Stimmed' latch is reset when NReset is low. (NReset is taken low during clrall or during nextact when this activity is being returned to the CPU.) Concurrent set and reset of the 'Stimmed' latch can occur, when NStimp from an asynchronous peripheral source is concurrent with NReset. The normally complementary outputs from the 'Stimmed' srlatch will both be high. This causes no problem because this activity will be being returned to the CPU as the next activity to be scheduled at this time. If removal of concurrent set and reset are coincident, the 'Stimmed' latch will, after the delay needed to resolve the metastability effect, become either set or reset. Time is available between executing instructions for the latch to settle: if it becomes set, NStimp is assumed to have occurred after nextact; if it becomes reset, NStimp is assumed to have occurred before nextact. Either condition provides for correct system operation.

When Slice is low, gate 3 output will be high and gate 4 output will be the inverse of the "stimmed" latch value. When Slice is high, gate 3 output will be the inverse of gate 4 output. If gate 4 output is high when Slice switches high, gate 4 output will be maintained high by the low on gate 3 output until Slice switches low. (Slice is high between a Do_Wait or a Suspend instruction and a subsequent Nextact instruction, i.e. during a context switch and low while a task/activity is running.) The inclusion of the gates 3 and 4 effectively defers visibility of a 'Stimmed' latch value change that is set following a Do_Wait or a Suspend instruction, until after a subsequent Nextact instruction, (i.e. when the 'Stimmed' latch is set by an asynchronous local peripheral during a context switch).

Ready is established high via gates 1 and 2 when the 'Stimmed' and 'Waiting' latches are both set; or via gate 1 when the 'Suspended' latch is set. (Note;—gate 2 has deferred visibility of a 'Stimmed' latch value that becomes set during a context switch.

Figure 4:
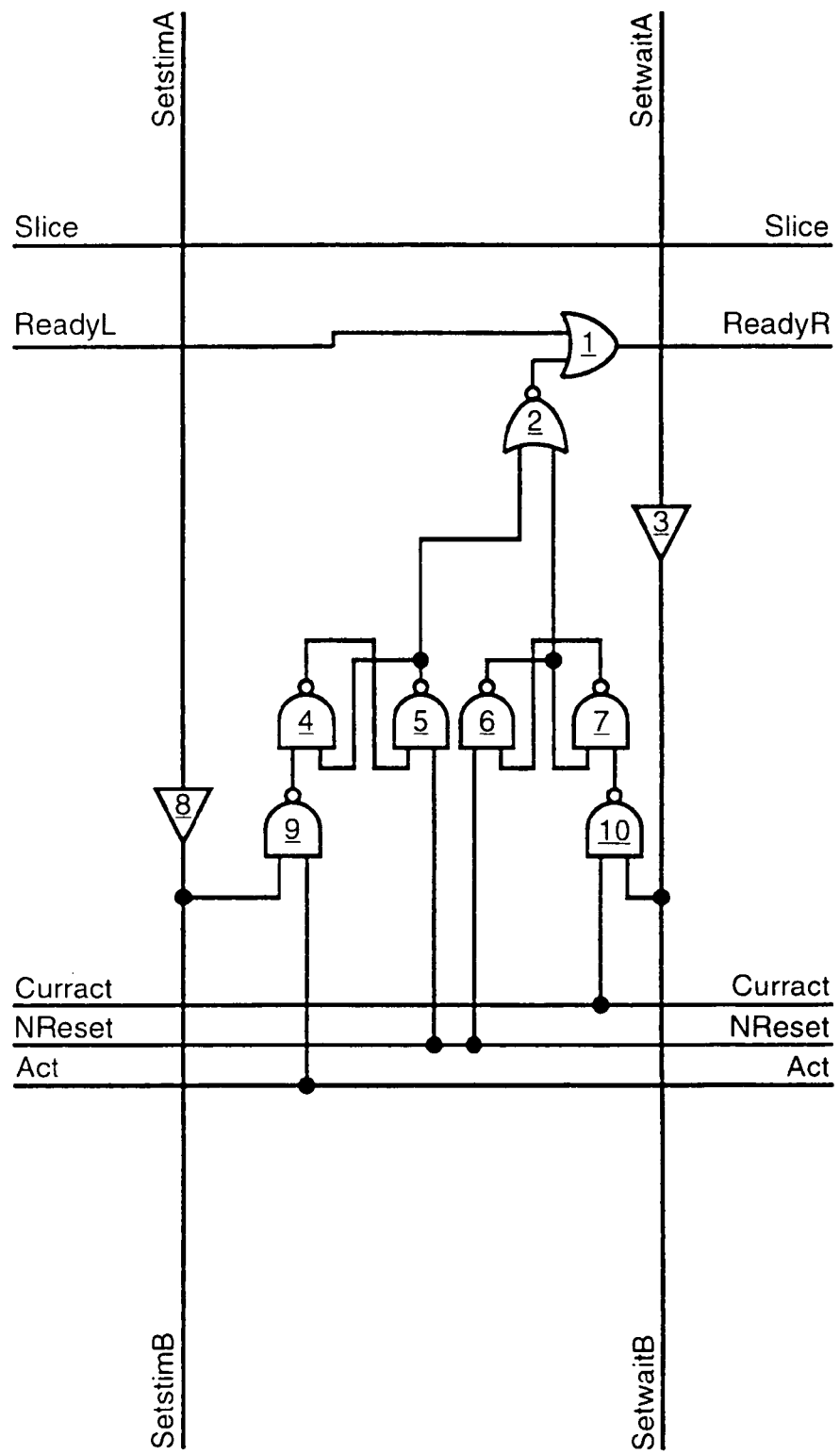

The structure of tile type 'U' is shown in FIG. 4. Its function is to hold an activity's internal "Stimmed" and "Waiting" Boolean variables, and to indicate whenever both this pair of "Stimmed" and "Waiting" variables are true, or transmit that a ready condition already exists.

Outputs:
  ReadyR to Tile_U or Tile_P or Tile_E
  SetstimB to Tile_U below
  SetwaitB to Tile_U below
Inputs:
  ReadyL from Tile_S or Tile_U or Tile_P
  Curract from Tile_U, Tile_P or Tile_E
  NReset from Tile_U, Tile_P or Tile_E
  Act from Tile_U, Tile_P or Tile_E
  SetstimA from Tile_U above
  SetwaitA from Tile_U above
Routes:
  Slice from Tile_U, Tile_P or Tile E to Tile_S, Tile_U or Tile_P
  Curract from Tile_U, Tile_P or Tile E to Tile_S, Tile_U or Tile_P
  NReset from Tile_U, Tile_P or Tile E to
  Act from Tile_U, Tile_P or Tile E to Tile_S, Tile_U or Tile_P The operation of tile type 'U' is as follows: Cross coupled gates 6 and 7 form a srlatch. This 'Waiting latch is set via gates 3 and 10 when SetwaitA and Curract are high. (SetwaitA is taken high during setwaiting if this stim-wait channel mask-bit was set in the most recent Load-Mask instruction; Curract is high when this was the last activity returned to the CPU for scheduling.) The 'Waiting' latch is reset when NReset is low. (NReset is taken low during clrall or during nextact when this activity is being returned to the CPU).) Concurrent set and reset of the 'Waiting' latch cannot occur, because SetwaitA is taken high and NReset is taken low, only while executing different instructions.

Cross coupled gates 4 and 5 form a srlatch. This 'Stimmed' latch is set via gates 8 and 9 when SetstimA and Act are high. (SetstimA is taken high during setstimmed if this stim-wait channel mask-bit was set in the most recent Load-Mask instruction; Act will be high whenever this activity was chosen by the most recent Load_Activity instruction.) The 'Stimmed' latch is reset when NReset is low. (NReset is taken low during clrall or during nextact when this activity is being returned to the processor.) Concurrent set and reset of the 'Stimmed' latch cannot occur, because SetstimA is taken high and NReset is taken low only while executing different instructions.

ReadyR is established high via gates 1 and 2 when the 'Stimmed' and 'Waiting' latches are both set; or via gate 1 when ReadyL is high.

Figure 5:
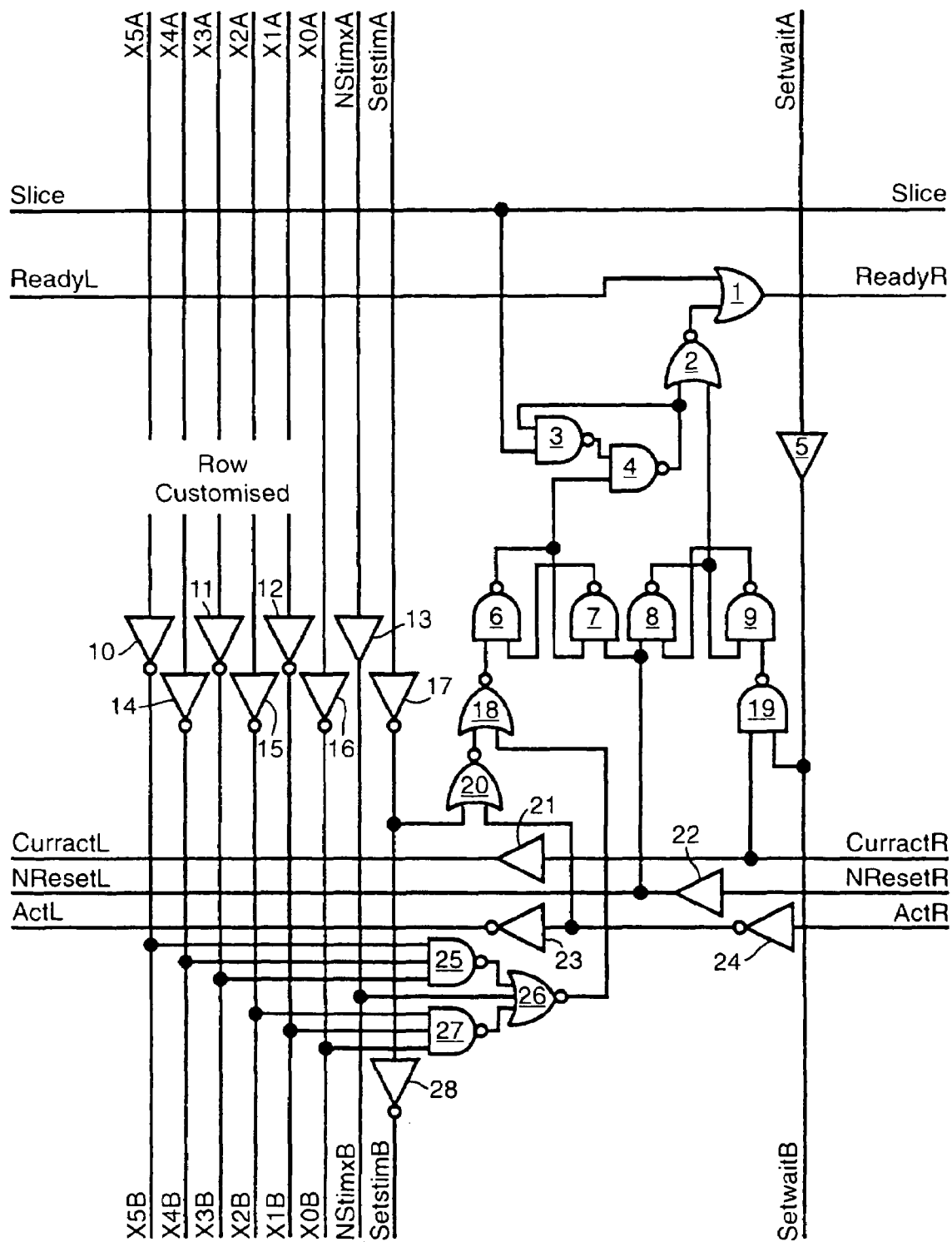

The structure of the type 'P' is shown in FIG. 5. Its function is to hold one pair of external "Stimmed" and "Waiting" Boolean variables for an activity and to indicate a ready condition whenever both this pair of "stimmed" and "waiting" variables are true, or transmit that a ready condition already exists.

Outputs:
  ReadyR to Tile_U or Tile_P or Tile_E
  X5B to Tile_P below
  X4B to Tile_P below
  X3B to Tile_P below
  X2B to Tile_P below
  X1B to Tile_P below
  X0B to Tile_P below
  NStimxB to Tile_P below
  SetstimB to Tile_P below
  SetwaitB to Tile_P below
  CurractL to Tile_S or Tile_U or Tile_P
  NResetL to Tile_S or Tile_U or Tile_P
  ActL to Tile_S or Tile_U or Tile_P
Inputs:
  X5A from Tile_P above
  X4A from Tile_P above
  X3A from Tile_P above
  X2A from Tile_P above
  X1A from Tile_P above
  X0A from Tile_P above
  NStimxA from Tile_P above
  SetstimA from Tile_P above
  SetwaitA from Tile_P above
  ReadyL from Tile_S or Tile_U or Tile_P
  Slice from Tile_U or Tile_P or Tile_E
  CurractR from Tile_U or Tile_P or Tile_E
  NResetR from Tile_U or Tile_P or Tile_E
  ActR from Tile_U or Tile_P or Tile_E Routes:

Slice from Tile_E, Tile_U or Tile_P to Tile_S, Tile_U or Tile_P

Figure 19:
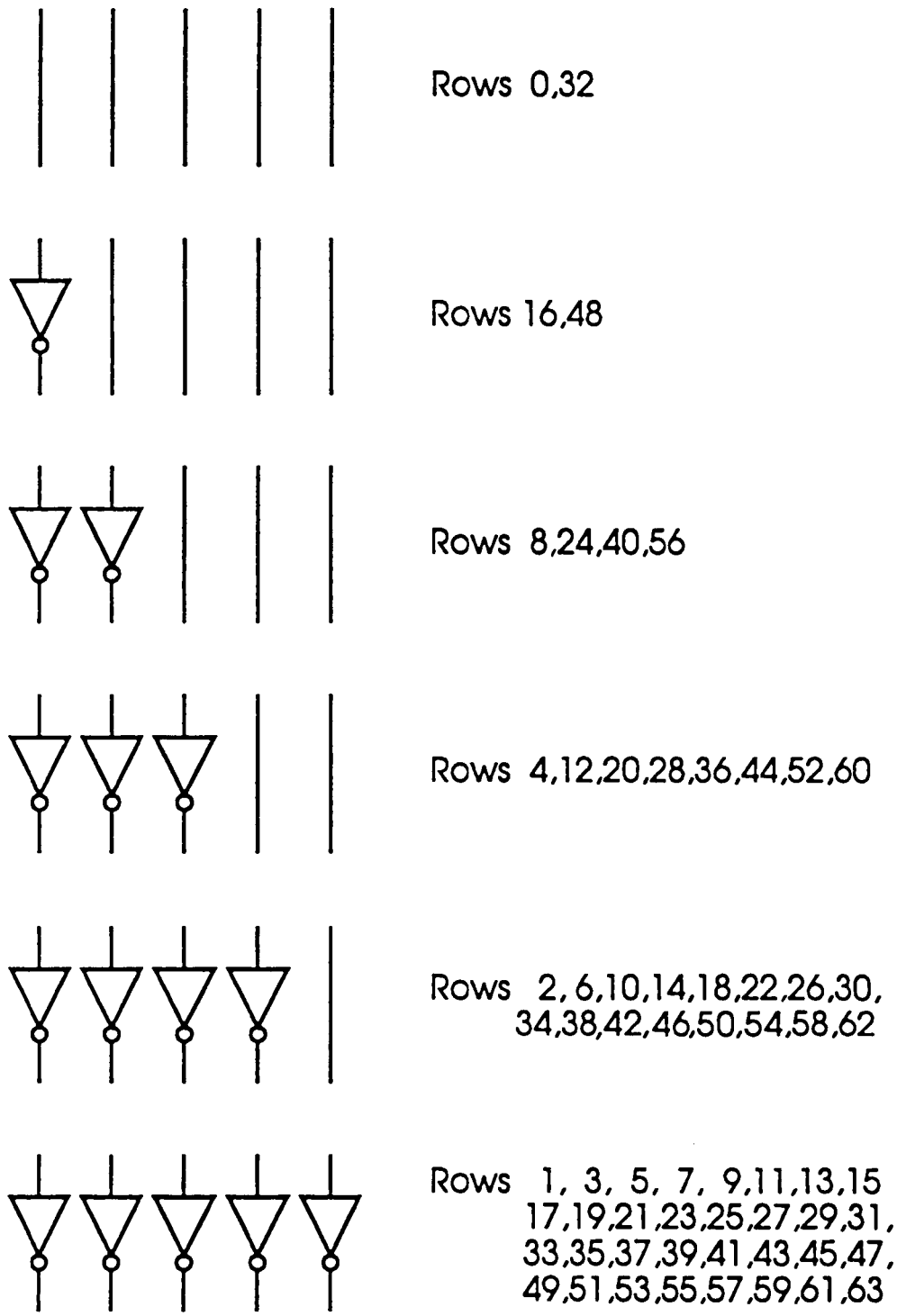
FIG. 19 is a series of wiring diagrams illustrating the customising of the tiles of FIGS. 5 and 6.

Each Tile_P is customised according to its row number in the array by inverting or transmitting values on lines X5A, X4A, X3A, X2A and X1A (see FIG. 19). The customising pattern of FIG. 19 ensures that only one row (the activity being externally addressed) will establish all six lines high. When all six lines are high, the outputs of gates 25 and 27 will both be low.

In operation, cross-coupled gates 8 and 9 form a srlatch. This 'Waiting' latch is set via gates 5 and 19 when SetwaitA and Curract are high. (SetwaitA is taken high during set-waiting if this stim-wait channel mask-bit was set in the most recent Load_Mask instruction; Curract is high when this was the last activity returned to the CPU for scheduling.) The 'Waiting' latch is reset via gate 22 when NResetR is low. (NResetR is taken low during clrall or during nextact when this activity is being returned to the CPU.) Concurrent set and reset of the 'Waiting' latch cannot occur, because SetwaitA is taken high and NResetR is taken low, only while executing different instructions.

Cross coupled gates 6 and 7 form a srlatch. This "stimmed" latch is set via gates 13, 18 and 26 when NStimxA and the outputs of gates 25 and 27 are low, or via gates 17, 18, 20 and 24 when SetstimA and ActR are high. (NStimxA is transmitted from a BUTLER input from an asynchronous external source; the outputs of gates 25 and 27 are low when this activity is being externally addressed; SetstimA is taken high during setstimmed if this stim-wait channel mask-bit was set in the most recent Load Mask instruction; Act will be high whenever this activity was chosen by the most recent Load_Activity instruction). The "Stimmed" latch is reset via gate 22 when NReset is low. (NReset is taken low during clrall or during nextact when this activity is being returned to the CPU). Concurrent set and reset of the "Stimmed" latch can occur when NStimxA from an asynchronous external source is concurrent with NResetR. The normally complementary outputs from the "Stimmed" srlatch will both be high. This causes no problem because this activity will be being returned to the CPU as the next activity to be scheduled at this time. If removal of concurrent set and reset are coincident, the "Stimmed" latch will, after the delay needed to resolve the metastability effect, become either set or reset. Time is available between executing instructions for the latch to settle: if it becomes set, NStimxA is assumed to have occurred after nextact; if it becomes reset, NStimxA is assumed to have occurred before nextact. Either condition provides for correct system operation.

When Slice is low, gate 3 output will be high and gate 4 output will be the inverse of the "stimmed" latch value. When Slice is high, gate 3 output will be the inverse of gate 4 output. If gate 4 output is high when Slice switches high, gate 4 output will be maintained high by the low on gate 3 output until Slice switches low. (Slice is high between a Do Wait or a Suspend instruction and a subsequent Nextact instruction i.e. during a context switch.) The inclusion of this circuitry effectively defers visibility of a "Stimmed" latch that is set, following a Do Wait or a Suspend instruction, until after a subsequent Nextact instruction (ie when the "Stimmed" latch is set by an asynchronous external stimulus during a context switch).

ReadyR is established high via gates 1 and 2 when the "Stimmed" and "Waiting" latches are both set; or via gate 1 when ReadyL is high. (Gate 2 has deferred visibility of a "stimmed" latch value that becomes set during a context switch).

Figure 6:
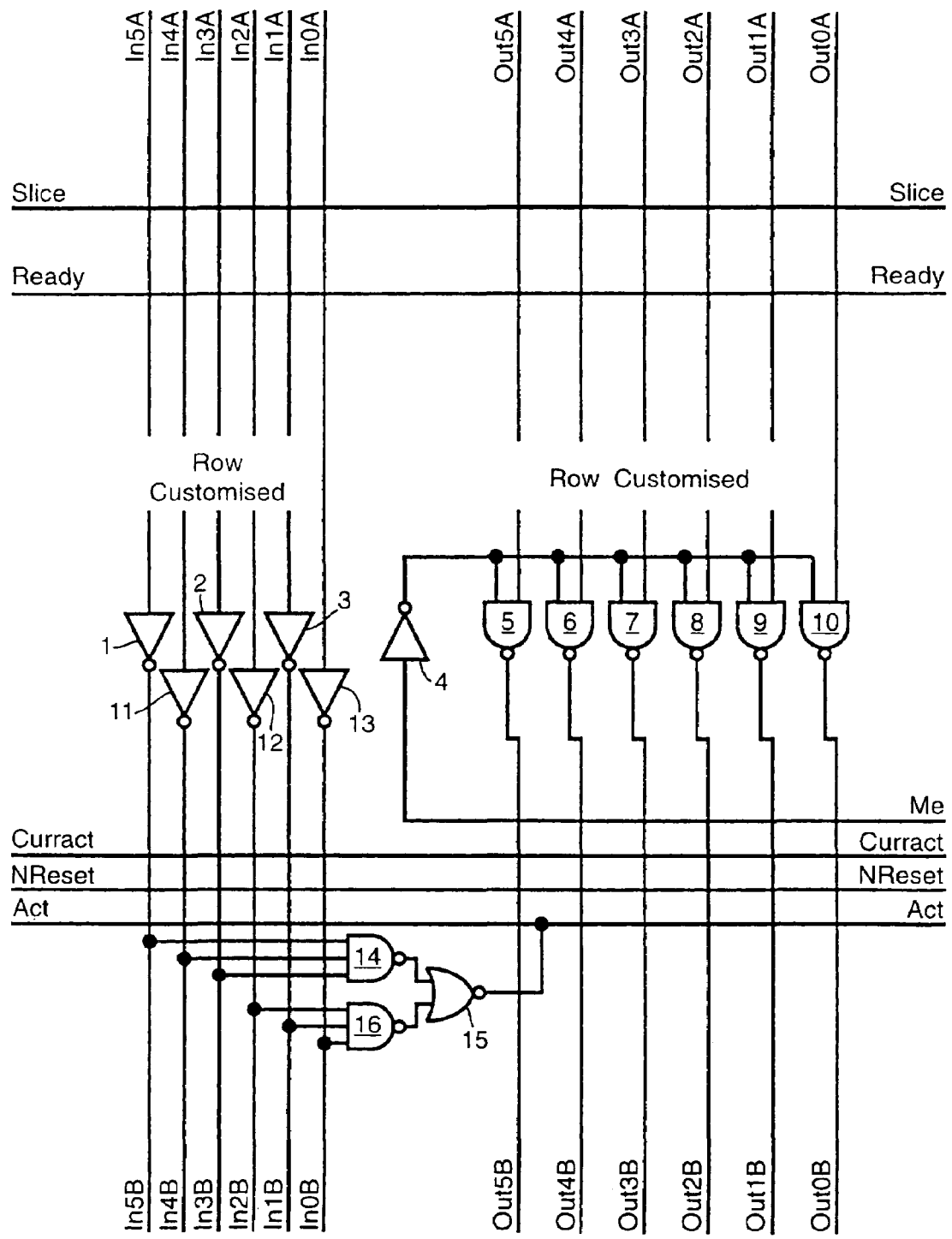

FIG. 6 shows the structure of tile type 'E', whose function is to identify whether an activity was chosen by the most recent "Load_Activity" instruction and to inject a starting point into the distributed activity number encoding logic when this is the next activity to be returned to the CPU for scheduling.

Outputs:
Act to Tile_U and Tile_R
In5B to Tile_E below
In4B to Tile_E below
In3B to Tile_E below
In2B to Tile_E below
In1B to Tile_E below
IN0B to Tile_E below
Out5B to Tile_E below
Out4B to Tile_E below
Out3B to Tile_E below
Out2B to Tile_E below
Out14B to Tile_E below
Out0B to Tile_E below Inputs:
In5A from Tile_E above
In4A from Tile_E above
In3A from Tile_E above
In2A from Tile_E above
In1A from Tile_E above
IN0A from Tile_E above
Me from Tile_R
Out5A from Tile_E above
Out4A from Tile_E above
Out3A from Tile_E above
Out2A from Tile_E above
Out1A from Tile_E above
Out0A from Tile_E above Routes:
Slice from Tile_R to Tile_U
Ready from Tile_R to Tile_U
Curract from Tile_R to Tile_U
NReset from Tile_R to Tile_U Each Tile_E is customised according to its row number in the array by inverting or transmitting values on lines In5A, In4A, In3A, In2A and In1A (see FIG. 19). The customising pattern of FIG. 19 ensures that only one row (the activity chosen by the most recent Load_Activity instruction) will establish all six lines high. Act is established high via gates 14, 15 and 16 whenever all six lines are high.

Similarly, each Tile_E is customised according to its row number in the array by inverting or transmitting values on lines Out5A, Out4A, Out3A, Out2A and Out1A. The customising pattern ensures that the activity that injects a starting point (i.e. establishes Out5B, Out4B, Out3B, Out2B, Out1B and Out0B high) will establish its encoded activity number on lines Out5B, Out4B, Out3B, Out2B, Out1B and Out0B at the bottom of the array.

Out5B, Out4B, Out3B, Out2B, Out1B and Out0B are established high via gates 4, 5, 6, 7, 8, 9 and 10 whenever Me is high. (Me will be high when this is the next activity to be returned to the CPU for scheduling.)

At the top of the array Out5A, Out4A, Out3A, Out2A, Out1A and Out0A are hardwired low. This ensures that the encoded number on the six lines at the bottom of the array will be zero when no schedulable activity is present in the array.

Figure 7:
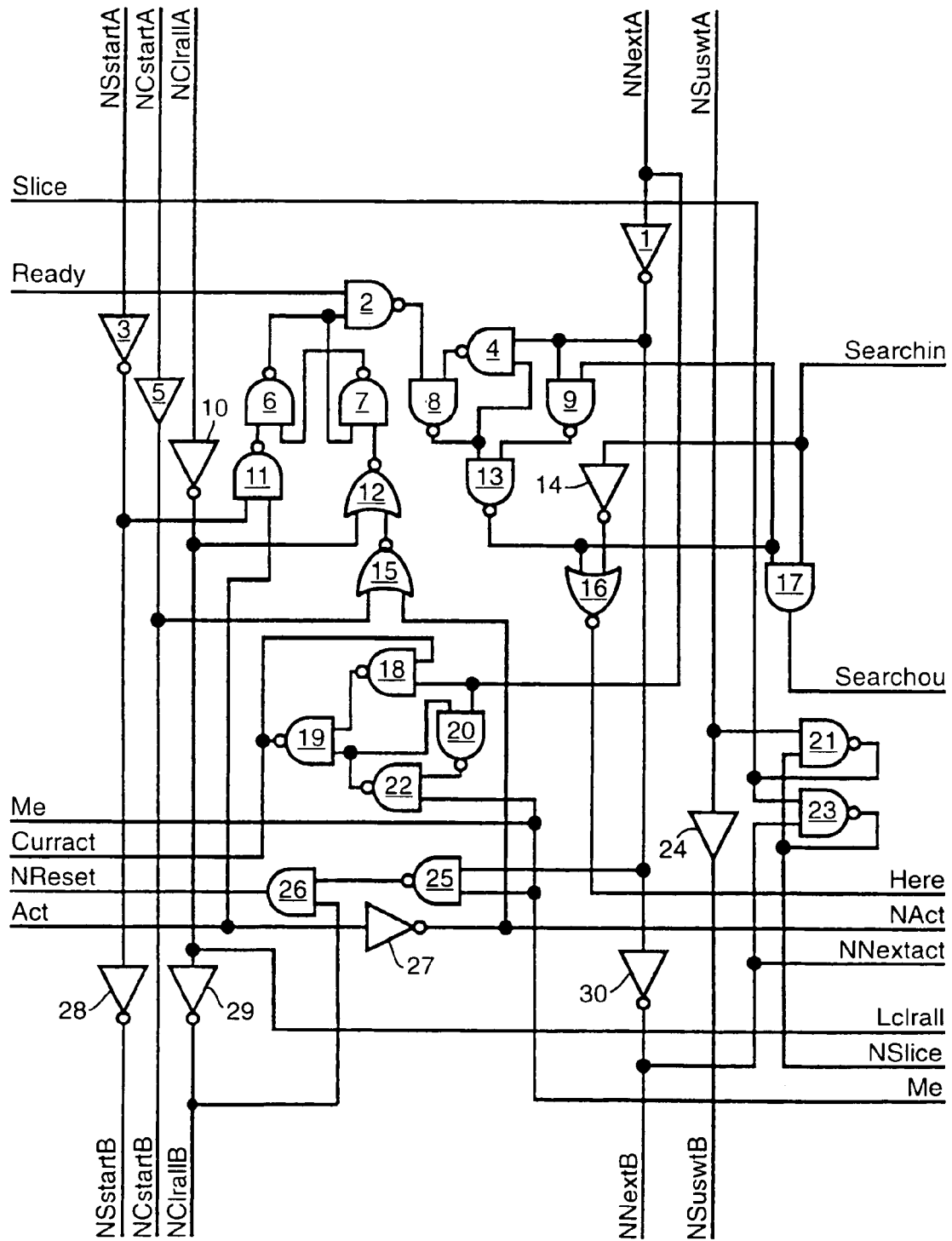

FIG. 7 shows the structure of tile type 'R' whose functions are to identify when a particular schedulable activity is the next one to be returned to the CPU and to remember when this is the activity currently running on the CPU ie to generate "Curract, the last "Me". Further functions are to identify when a context switch is in progress and to generate "Slice", to generate a reset for the activity's 'Suspended' latch and all of its 'Stimmed' and 'Waiting' latches, during nextact when the activity is being returned to the CPU, and to distribute signals to reset all the activity's srlatches during clrall.

Outputs:
  Here to Tile_M
  NSlice to Tile_M
  Slice to Tile_E
  Curract to Tile_E
  NReset to Tile_E
  Lclrall to Tile_M
  Searchou to Tile_M
  NAct to Tile_M
  NNextact to Tile_M
  NSstartB to Tile_R below
  NCstartB to Tile_R below
  NClrallB to Tile_R below
  NNextB to Tile_R below
  SuswtB to Tile_R below
Inputs:
  Ready from Tile_E
  Act from Tile_E
  Searchin from Tile_M
  Me from Tile_M
  NSstartA from Tile_R above
  NCstartA from Tile_R above
  NClrallA from Tile_R above
  NNextA from Tile_R above
  NSuswtA from Tile_R above
Routes:
  Me from Tile_M to Tile_E Cross-coupled gates 21 and 23 form a srlatch. This 'Switching' latch is set when NSuswtA is low, (i.e. during a Do Wait or a Suspend instruction.) The 'Switching' latch is reset via gates 1 and 30 when NNextA is low. (NNextA is taken low during nextact.) Concurrent set and reset of the 'Switching' latch cannot occur, because NSuswtA and NNextA are taken low, only while executing different instructions. Slice will be high and NSlice will be low when the 'Switching' latch is set.

Cross-coupled gates 6 and 7 form a srlatch. This 'Started' latch is set via gates 3 and 11 when NSstartA is low and Act is high. (NSstartA is taken low during setstarted; Act will be high whenever this activity was chosen by the most recent Load_Activity instruction.) The 'Started' latch is reset via gates 10 and 12 when NClrall is low; or via gates 5, 12, 15 and 27 when NCstartA is low and Act is high. (NClrall is taken low during clrall; NCstartA is taken low during clrstarted; Act will be high whenever this activity was chosen by the most recent Load_Activity instruction.) Concurrent set and reset of the 'Started' latch cannot occur, because NSstartA, NCstartA and NClrallA are taken low, only while executing different instructions.

When the 'Started' latch is set and Ready is high, the output from gate 2 will be low, indicating that this activity is a candidate for scheduling.

Gates 4, 8, 9 and 13 form a tlatch. The tlatch is used to retain the value on the output of gate 2, existing at the start of nextact for the duration of nextact. At all other times the tlatch output (gate 13 output) tracks the value on the output of gate 2, (i.e. the output of gate 13 will be maintained low for the whole duration of nextact when this activity is a candidate for scheduling).

Here is established high via gates 14 and 16 when the output of gate 13 is low and Searchin is high (i.e. when this activity is a candidate for scheduling and no schedulable activity has been found in the search logic chain so far).

Searchou is established low (indicating that a schedulable activity has been found in the search logic chain) via gate 17, when either the output from gate 13 or Searchin are low.

Gates 18, 19, 20 and 22 form a tlatch. This 'Curract' tlatch is used to retain the value of Me between nextacts. It is transparent (updated) only during nextact.

NReset is taken low when either NNextA is taken low and Me is high, via gates 1, 25 and 26, or NClrallA is taken low, via gates 10, 29 and 26 (i.e. during nextact when this activity is being returned to the CPU, or during clrall).

Lclrall (a local clear-all signal.) is taken high via gate 10, when NClrallA is taken low (i.e. during clrall).

NNextact is taken low via gates 1 and 30, when NNextA is taken low (i.e. during Nextact).

NAct is established low via gate 27 when Act is high. (Act will be high whenever this activity was selected by the most recent Load Activity instruction.)

Figure 8:
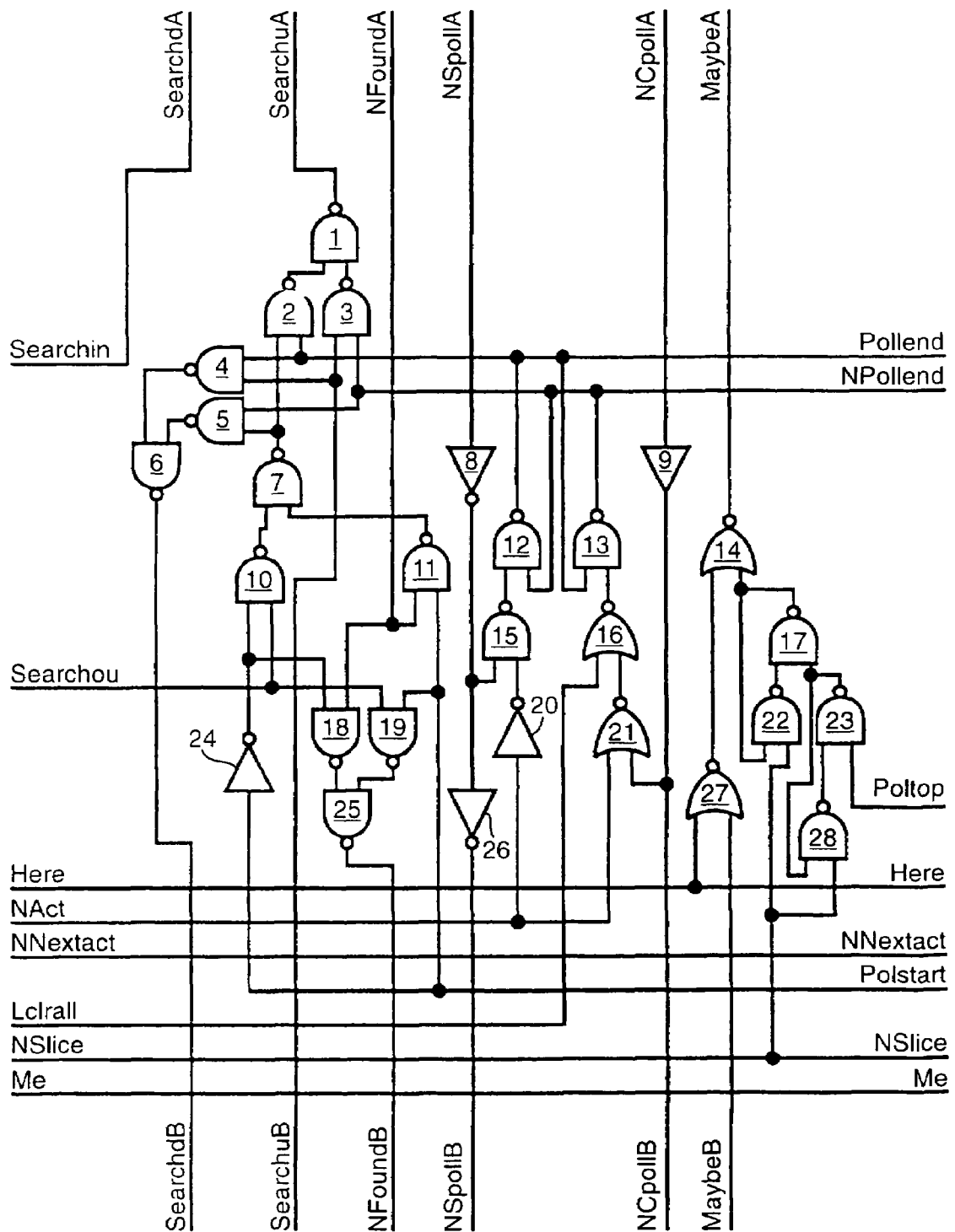

The structure of tile type 'M' is shown in FIG. 8. Its functions are to configure the next activity search logic chain, to allow designation of the pollset boundaries and to identify when a higher priority activity than that currently running on the CPU may be available for scheduling.

Outputs:
  Pollend to Tile_A
  NPollend to Tile_A
  MaybeA to Tile_M above
  SearchuA to Tile_M above
  SearchdB to Tile_M below
  NFoundB to Tile_M below
  NSpollB to Tile_M below
  NCpollB to Tile_M below
Inputs:
  Searchou from Tile_R
  Here from Tile_R
  NAct from Tile_R
  Lclrall from Tile_R
  NSlice from Tile_R
  Polstart from Tile_A Poltop from Tile_A
  NFoundA from Tile_M above
  NSpollA from Tile_M above
  NCpollA from Tile_M above
  SearchuB from Tile_M below
  MaybeB from Tile_M below
Routes:
  Here from Tile_R to Tile_A
  NNextact from Tile_R to Tile_A
  Me from Tile_A to Tile_R
  NSlice from Tile_R to Tile_A
  SearchdA/Searchin from Tile_M above to Tile_R Cross-coupled gates 12 and 13 form a srlatch.

This 'Pollend' latch is set via gates 8, 15 and 20 when NSpollA and NAct are low. (NSpollA is taken low during setpollend; NAct will be low whenever this activity was chosen by the most recent Load_Activity instruction.) The 'Pollend' latch is reset via gate 16 when Lclrall is high, or via gates 9, 16 and 21 when NCpollA and NAct are low. (Lclrall is taken high during clrall; NCpollA is taken low during clrpollend; NAct will be low whenever this activity was chosen by the most recent Load_Activity instruction.) Concurrent set and reset of the 'Pollend' latch cannot occur, because NSpollA, NCpollA and Lclrall are taken low, only while executing different instructions.

A round robin search loop is formed for each designated pollset. A single search chain passing through all activities is configured that runs through each round robin search loop in turn, respecting the priority order of the pollsets.

When not selected as the lowest activity number in a pollset, Pollend will be low and complementary NPollend will be high. The value on SearchuB is transmitted to SearchuA via gates 1 and 3. When not the starting point in a round robin search, Polstart will be low. The value on Searchou will be transmitted to SearchdB via gates 5, 6, 7 and 10 and the value on NFoundA will be transmitted to NFoundB via gates 18 and 25. (NFoundA will be low when a higher priority pollset has already found an activity to schedule.) When the starting point in a round robin search, Polstart will be high. The value on NFoundA will be transmitted to SearchdB via gates 5, 6, 7 and 11, and the value on Searchou will be transmitted to NFoundB via gates 19 and 25.

When selected as the lowest activity number in a pollset (i.e. with Pollend high and complementary NPollend low) a round robin search loop boundary is formed. The value on SearchuB is transmitted to SearchdB via gates 4 and 6. When not the starting point in a round robin search, Polstart will be low. The value on NFoundA will be transmitted to NFoundB via gates 18 and 25, and the value on Searchou will be transmitted to SearchuA via gates 1, 2, 7 and 10. When the starting point in a round robin search, Polstart will be high. The value on NFoundA will be transmitted to NSearchuA via gates 1, 2, 7 and 11, and the value on Searchou will be transmitted to FoundB via gates 12 and 25.

At the top of the array SearchuA is connected to SearchdA to complete a search loop, and NFoundA hardwired high to indicate that no higher priority pollset has found a schedulable activity.

At the bottom of the array SearchdB is connected to SearchuB to complete a search loop. NFoundB is high when no schedulable activity is present in the array and is connected to D6out, to return activity 64 (the idle activity).

A logic chain running up the array is used to determine when there is a schedulable activity belonging to a higher priority pollset. The logic chain is made false when it crosses the top of the pollset of the last activity returned to the CPU. The chain is made true when a potentially schedulable activity is identified.

Gates 17, 22, 23 and 28 form a tlatch that is used to retain the value of Poltop between context switches (i.e. gate 17 output remembers when this activity has the smallest number in the pollset of the activity currently running on the CPU). The tlatch is made transparent (updated) when NSlice is low. (Nslice will be low during a context switch, i.e. between a Suspend or a Do__Wait instruction and a subsequent Nextact instruction.)

MaybeA is established low via gate 14, when the output on gate 17 is high. MaybeA is established high when the output on gate 17 is low. Either Me or MaybeB are high via gates 14 and 27.

At the bottom of the array MaybeB is hard-wired low.

Figure 9:
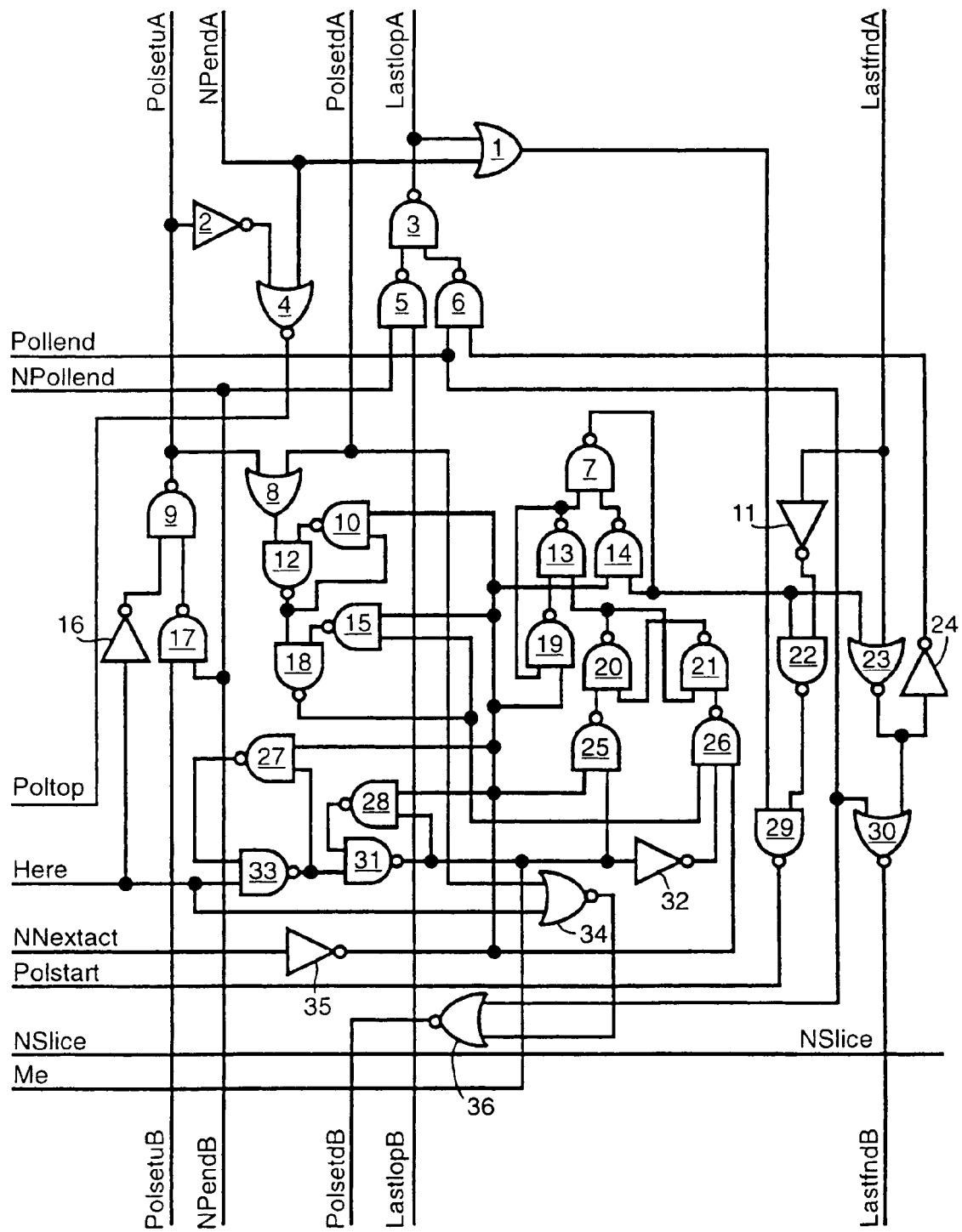

The structure of tile type 'A' is shown in FIG. 9. Its function is to identify when an activity has the smallest number in the pollset of the next activity to be returned to the CPU and to indicate within each pollset the starting point for the round robin search logic.

Outputs:
  Poltop to Tile__M
  Polstart to Tile__M
  Me to Tile__M
  LastlopA to Tile__A above
  PolsetuA to Tile__A above
  LastfndB to Tile__A below
  PolsetdB to Tile__A below
  NPendB to Tile__A below
Inputs:
  Pollend from Tile__M
  NPollend from Tile__M
  Here from Tile__M
  NNextact from Tile__M
  PolsetdA from Tile__A above
  NPendA from Tile__A above
  LastfndA from Tile__A above
  LastlopB from Tile__A below
  PolsetuB from Tile__A below
Routes:
  NSlice from Tile__M to Tile__N To determine which activities are included in the pollset of the next activity to be scheduled, two logic chains are used, one running down the array and one running up the array. Each time a chain crosses a pollset boundary it is made false but when it encounters the next activity to be scheduled it is made true. The relevant pollset members are those activity rows which contain a true logic element in either chain. The activity with the smallest number in this pollset will have a true value in the logic chain running up the array, together with a pollset boundary having been selected in the row above.

When not selected as having the largest activity number in a pollset Pollend will be low and complementary NPollend will be high. When Here is low the value on PolsetdA is transmitted to PolsetdB via gates 34 and 36, and the value on PolsetuB is transmitted to PolsetuA via gates 9, 16 and 17. When Here is high, PolsetdB is established high via gates 34 and 36, and PolsetuA is established high via gates 9 and 16.

When selected as having the largest activity number in a pollset (i.e. with Pollend high and complementary NPollend low), PolsetdB is established low via gates 36. When Here is low, PolsetuA is established low via gates 9, 16 and 17. When Here is high, PolsetuA is established high via gates 9 and 16.

The output of gate 8 is established low whenever either PolsetdA or PolsetuA are high (indicating that this activity is in the pollset of the activity about to be returned to the CPU for scheduling). Gates 10, 12, 15 and 18 form a tlatch. The tlatch is used to retain the value existing at the output of gate 8 at the start of nextact for the duraction of nextact. At all other times the output of gate 18 tracks the output of gate 8.

Poltop is established high via gates 2 and 4 when PolsetuA is high and NPendA is low (i.e. when an activity has the smallest activity number in the pollset of the activity to about to be returned to the CPU for scheduling). Gates 27, 28, 31 and 33 form a tlatch. The tlatch is used to retain the value of Here existing at the start of nextact for the duraction of nextact. At all other times the value of Me tracks Here.

Cross-coupled gates 20 and 21 form a srlatch that is used to remember whether this was the last activity scheduled in this activity's pollset. This 'Last' latch is set via gates 25 and 35 when NNextact is low and Me is high. (NNextact is taken low during nextact; Me will be high when this activity is the next activity to be returned to the CPU for scheduling.) The 'Last' latch is reset via gates 26, 32 and 35 when Me is low and the output of gate 18 is high and NNextact is low. (Me will be low when this is not the next activity to be returned to the CPU; the output of gate 18 will be high when this activity is in the pollset of the activity about to be returned to the CPU for scheduling; NNextact is taken low during nextact.) Concurrent set and reset of the 'Last' latch cannot occur, because Me must be high to set the latch but low to reset the latch.

Gates 7, 13, 14 and 19 form a tlatch. The tlatch is used to retain the 'Last' latch value existing at the start of nextact for the duration of nextact, whilst the 'Last' latch value may be being updated. At all other times the tlatch output tracks the value of the 'Last' latch.

Under normal operation precisely one 'Last' latch will be set within the group of activities comprising a pollset, and this will determine where Polstart should be established high. However it is possible when reprogramming pollset boundaries or following initial power up that abnormal conditions could occur. Therefore additional logic is included to ensure correct operation and restore normal operation if ever zero or multiple 'Last' latches become set within a pollset.

The pollset is examined by a loop of logic that accepts the first set 'Last' latch it finds and ignores others, but if it finds none then inserts a high Polstart at the pollset boundary. Correct operation is thereby achieved and normal operation resumes following the next returned activity from the offending pollset.

When not selected as having the largest activity number in a pollset, Pollend will be low and complementary NPollend will be high. LastfndB is established high via gates 23 and 30 when either this 'Last' latch is set or LastfndA is high. (A high on input LastfndA indicates that a set 'Last' latch has already been found in this pollset.) The value on input LastlopB is transmitted via gates 3 and 5 to LastlopA; again a high indicating that a 'Last' latch has already been found in this pollset.

When selected as having the largest activity number in a pollset (i.e. with Pollend high and complementary NPollend low), a logic loop is formed. LastlopA is established high via gates 3, 6, 23 and 24, when either this 'Last' latch is set or LastfndA is high. LastfndB is established low via gate 30 (indicating that no set 'Last' latch has yet been found; in this case because it is the first in the next pollset).

Polstart is established high via gates 11, 22 and 29 when this 'Last' latch is set and LastfndA is low (i.e. when no set 'Last' latch has already been found in this pollset, and this 'Last' latch is set). Polstart is also established high via gates 1 and 29 when LastlopA and NPend are low (i.e. the abnormal condition where no 'Last' latches are set in this pollset).

At the top of the array, LastfndA is hardwired low (to indicate that no set 'Last' latch has yet been found). NPendA is hardwired low (to indicate the first pollset boundary). PolsetdA is hardwired low (to indicate crossing the first pollset boundary).

At the bottom of the array LastfndB is connected to LastlopB to complete a logic loop. This ensures that when no pollset boundaries are selected, one overall pollset containing activities 0 to 63 will be realised. PolsetuA is hardwired low (to indicate crossing the final pollset boundary).

Figure 10:
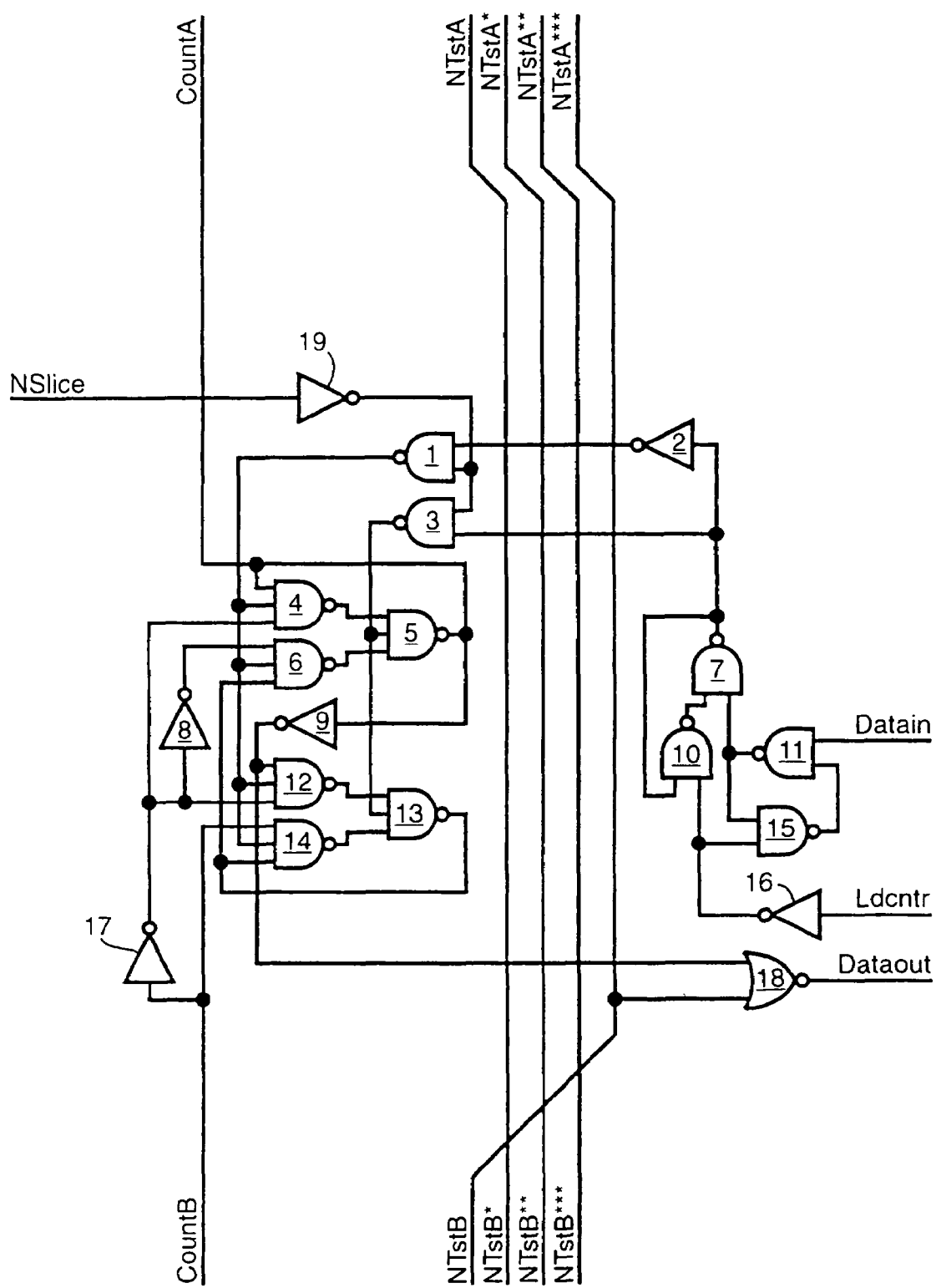

The structure of tile type 'N' is shown in FIG. 10. This tile's function is to implement one-bit of the "Butler chip's" ripple down-counter.

The 'N' tiles make up a 32-bit register which is used to monitor or to set the duration of a processing slice. The register is loaded at the start of a processing slice and the counter decrements this initial value during the slice.

Outputs:
  NTstB to Tile_N below
  NTstB* to Tile_N below
  NTstB** to Tile_N below
  NTstB***to Tile_N below
  CountA to Tile_N above
  Dataout to Tile_N BUTLER I/O bidirectional output
Inputs:
  NSlice from Tile_A (even numbered rows only)
  NTstA from Tile_N above
  NTstA* from Tile_N above
  NTstA** from Tile_N above
  NTstA*** from Tile_N above
  CountB from Tile_N below
  Datain from Tile_N BUTLER I/O bidirectional input
  Ldcntr from Tile_Ntop NTstA, NTstA*, NTstA and NTstA* are functionally the same signal but are physically duplicated to limit loading. Crossing the four lines over within a tile means that the tile circuitry will only be connected to a particular line every fourth tile down the Tile_N column.

Gates 7, 10, 11 and 15 form a tlatch. The tlatch forms one bit of a 32-bit latch whose content is used to initialise the counter. The tlatch is transparent (updated) when Ldcntr is low, and latched when Ldcntr is high. The value on Datain is established at the output of gate 7 when Ldcntr is taken low (i.e. during a relevant Load_Counter instruction). This value is retained when Ldcntr is high (i.e. between relevant Load_Counter instructions).

Gates 12, 13, 14 and 17, and gates 4, 5, 6 and 8 form a pair of tlatches. When one is transparent the other is latched; the way round determined by the value on CountB. The output from the first tlatch (gate 13) is connected to the input of the second (gate 6). The output from the second tlatch (gate 5) is inverted via gate 9 and connected to the input of the first (gate 12). When the outputs on gates 1 and 3 are high, this arrangement of gates implements one bit of a binary transition counter. CountA will toggle (invert its value) when CountB changes from a low to a high.

When NSlice is low, the one-bit transition counter is initialised to the value at the output of gate 7; via gates 1 and 2 when the value is low, via gate 3 when the value is high. (NSlice will be low during a context switch, i.e. between a Suspend or a Do_Wait instruction and a subsequent Nextact instruction.)

When NSlice is high, the outputs on gates 1 and 3 will be established high via gate 19, enabling the counter to count.

Dataout will be established to the one-bit counter value (the output from gate 7), via gates 9 and 18 when NTestA* is low. (NTestA* is taken low during a Control_Interrupts instruction). Dataout is established low when NTestA*** is high.

The tiles of the top row 12 will now be described with reference to FIGS. 11–18.

Figure 11:
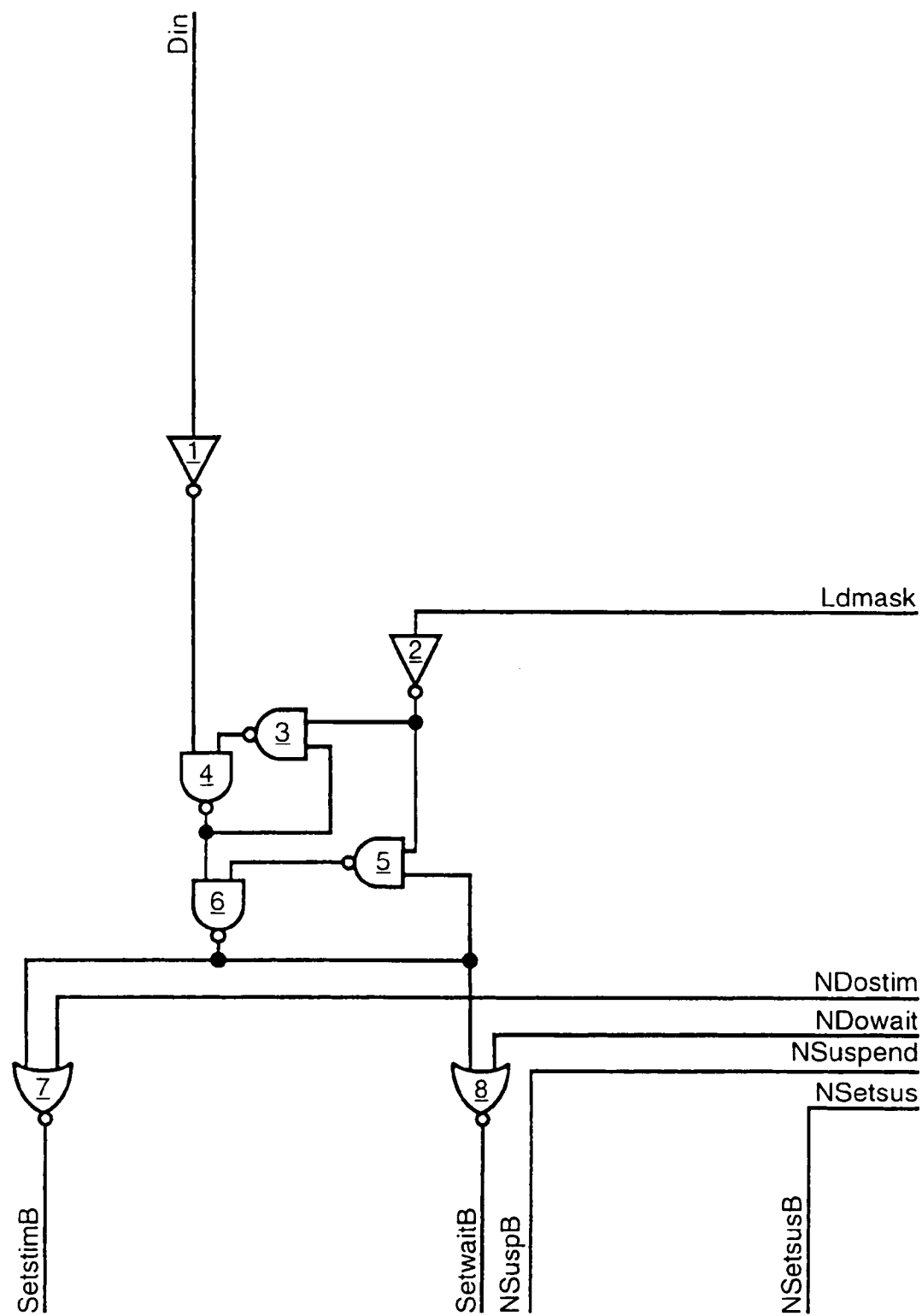
FIGS. 11–18 are logic circuit diagrams of the tiles comprising a "top row" of a "Butler chip"
Figure 12:
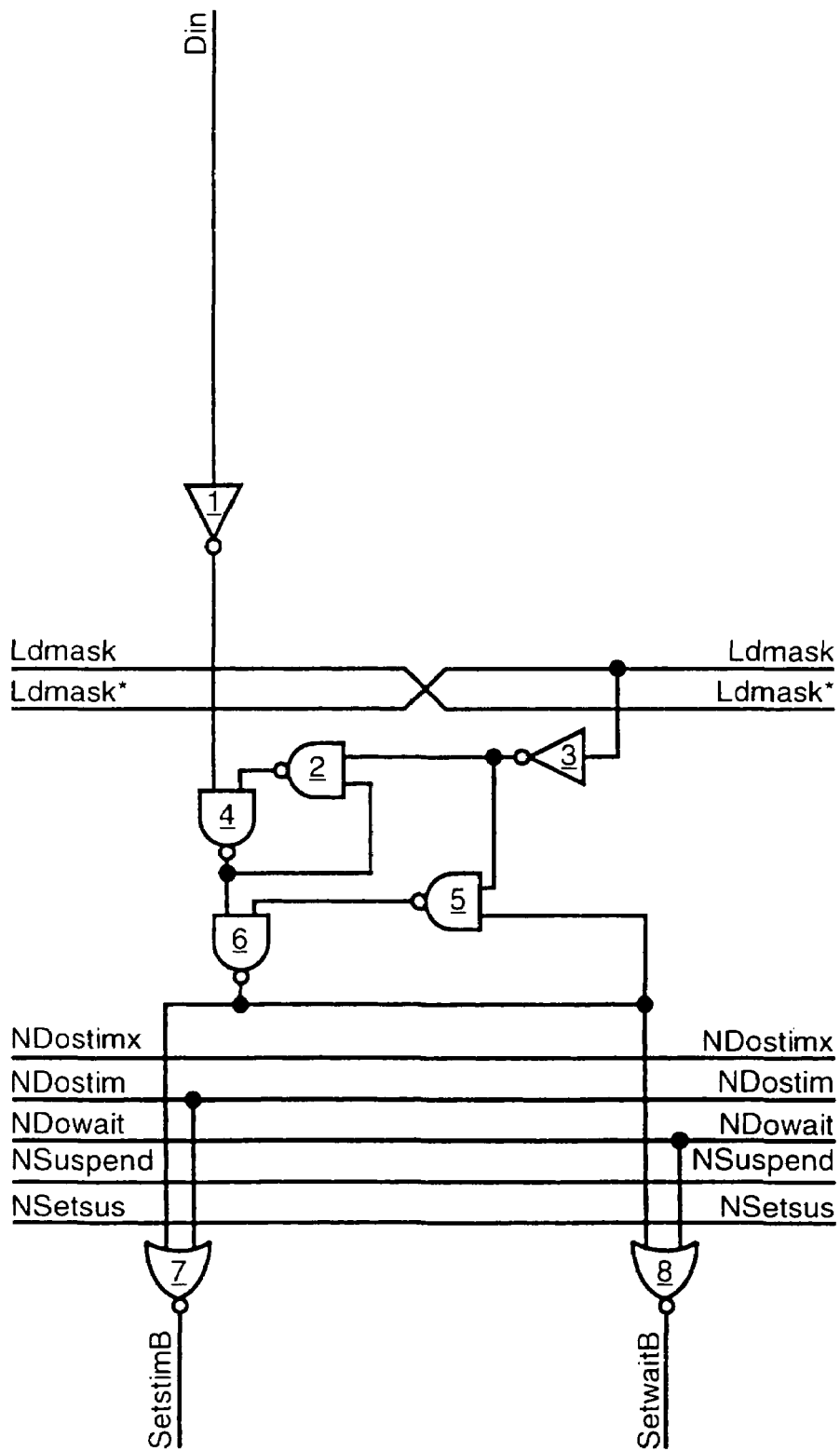

FIG. 11 shows tile type 'S-top' whose functions are as follows: To remember whether this stim-wait channel's mask bit was set in the most recent Load_Mask instruction; to generate a setstimmed array-operation pulse during a Do_Stim instruction when this stim-wait channel's mask bit was set in the most recent Load Mask instruction; to generate a setwaiting array-operation pulse during a Do_Wait instruction when this stim-wait channel mask bit was set in the most recent Load_Mask instruction.
Outputs:
  SetstimB to Tile_S below
  SetwaitB to Tile_S below Inputs:
   Din from BUTLER I/O input
   Ldmask from Tile_Utop
   NDostim from Tile_Utop
   NDowait from Tile_Utop
Routes:
   NSuspend/NSuspB from Tile_Utop to Tile_S below
   NSetsus/NSetsusB from Tile_Utop to Tile_S below
   Gates 3, 4, 5 and 6 form a tlatch. The tlatch holds one bit of the stim-wait channel mask. The tlatch is transparent (updated) when Ldmask is high, and latched when Ldmask is low, The inverse of the value on Din is established at the output of gate 6 when Ldmask is taken high (i.e. during a Load_Mask instruction). This value is retained when Ldmask is lowh (i.e. between Load_Mask instructions).
   SetstimB is taken high via gate 7 if the output of gate 6 is low when NDostim is taken low (i.e. during a Do-Stim instruction).
   SetwaitB is taken high via gate 8 if the output of gate 6 is low when NDowait is taken low (i.e. during a Do_Wait instruction).
   FIG. 12 shows tile type 'U-top' whose functions are to remember whether this stim-wait channel's mask bit was set in the most recent Load_Mask instruction, to generate a setstimmed array-operation pulse during a Do-Stim instruction when this stim-wait channel mask bit was set in the most recent Load Mask instruction and to generate a setwaiting array-operation pulse during a Do_Wait instruction when this stim-wait channel's mask bit was set in the most recent Load Mask instruction.
Outputs:
   SetstimB to Tile_U below
   SetwaitB to Tile_U below
Inputs:
   Din from BUTLER I/O input
   Ldmask from Tile_Utop or Tile_Ptop or Tile_Etop
   NDostim from Tile_Utop or Tile_Ptop or Tile_Etop
   NDowait from Tile_Utop or Tile_Ptop or Tile_Etop
Routes:
   Ldmask from Tile_Utop, Ptop or Etop to Tile_STop, Utop or Ptop
   Ldmask* from Tile_Utop, Ptop or Etop to Tile_STop, Utop or Ptop
   NDostimx from Tile_Utop, Ptop or Etop to Tile_STop, Utop or Ptop
   NDostim from Tile_Utop, Ptop or Etop to Tile_STop, Utop or Ptop
   NDowait from Tile_Utop, Ptop or Etop to Tile_STop, Utop or Ptop
   NSuspend from Tile_Utop, Ptop or Etop to Tile_STop, Utop or Ptop
   NSetsus from Tile_Utop, Ptop or Etop to Tile STop, Utop or Ptop
   Ldmask and Ldmask* are functionally the same signal but are physically duplicated to limit loading. Crossing the two lines over within a tile means that the tile circuitry is only connected to a particular line, in alternate tile positions across the array.
   Gates 2, 4, 5 and 6 form a tlatch. The tlatch holds one bit of the stim-wait channel mask. The tlatch is transparent (updated) when Ldmask is high, and latched when Ldmask is low. The inverse of the value on Din is established at the output of gate 6 when Ldmask is taken high (i.e. during a Load_Mask instruction). This value is retained when Ldmask is low (i.e. between Load_Mask instructions).

Figure 13:
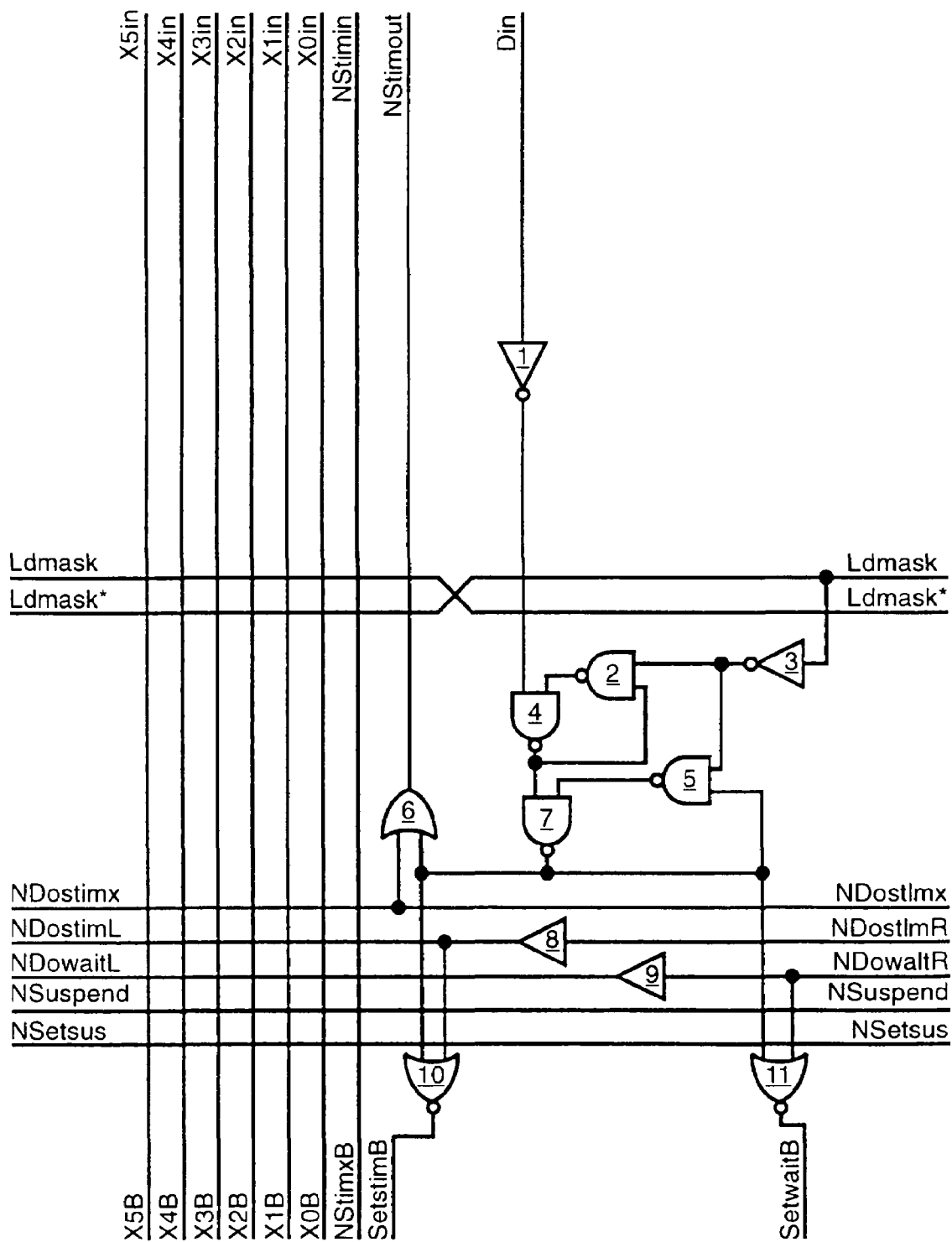

SetstimB is taken high via gate 7 if the output of gate 6 is low when NDostimR is taken low (i.e. whilst executing Do-Stim instruction).
   SetwaitB is taken high via gate 8 if the output of gate 6 is low when NDowaitR is taken low (i.e. whilst executing Do_Wait instruction).
   The structure of tile type 'P-top' is shown in FIG. 13. The functions of this tile are to remember whether this stim-wait channel's mask bit was set in the most recent Load_Mask instruction, to generate an external stimulus output during a Do-Stimx instruction when this stim-wait channel's mask bit was set in the most recent Load_Mask instruction, to generate a setstimmed array-operation pulse during a Do-Stim instruction when this stim-wait channel's mask bit was set in the most recent Load_Mask instruction and to generate a setwaiting array-operation pulse during a Do_Wait instruction when this stim-wait channel mask bit was set in the most recent Load_Mask instruction.
Outputs:
   NStimout to BUTLER I/O output
   SetstimB to Tile_P below
   SetwaitB to Tile_P below
   NDostimL to Tile_Stop or Tile_Utop or Tile_Ptop
   NDowaitL to Tile_Stop or Tile_Utop or Tile_Ptop
Inputs:
   Din from BUTLER I/O input
   Ldmask from Tile_Utop or Tile_Ptop or Tile_Etop
   NDostimR from Tile_Utop or Tile_Ptop or Tile_Etop
   NDowaitR from Tile_Utop or Tile_Ptop or Tile_Etop
Routes:
   Ldmask from Tile_Utop, Ptop or Etop to Tile_STop, Utop or Ptop
   Ldmask* from Tile_Utop, Ptop or Etop to Tile_STop, Utop or Ptop
   NSuspend from Tile_Utop, Ptop or Etop to Tile_STop, Utop or Ptop
   NSetsus from Tile_Utop, Ptop or Etop to Tile_STop, Utop or Ptop
   NDostimx from Tile_Utop, Ptop or Etop to Tile_Utop or Ptop
   X5 in/X5B from BUTLER I/O input to Tile_P below
   X4 in/X4B from BUTLER I/O input to Tile_P below
   X3 in/X3B from BUTLER I/O input to Tile_P below
   X2 in/X2B from BUTLER I/O input to Tile_P below
   X1in/X1B from BUTLER I/O input to TileP below
   X0in/X0B from BUTLER I/O input to Tile_P below
   NStimin/NStimxB from BUTLER I/O input to Tile_P below
   NLdmask and NLdmask* are functionally the same signal but are physically duplicated to limit loading. Crossing the two lines over within a tile means that the tile circuitry is only connected to a particular line, in alternate tile positions across the array.
   Gates 2, 4, 5 and 7 form a tlatch. The tlatch holds one bit of the stim-wait channel mask. The tlatch is transparent (updated) when Ldmask is high, and latched when Ldmask is low. The inverse of the value on Din is established at the output of gate 7 when Ldmask is taken high (i.e. during a Load_Mask instruction). This value is retained when Ldmask is low (i.e. between Load_Mask instructions).
   NStimout is taken low via gate 6 if the output of gate 7 is low when NDostimx is taken low (i.e. during a Do_Stimx instruction).
   SetstimB is taken high via gates 8 and 10 if the output of gate 7 is low when NDostimR is taken low (i.e. during a Do_Stim instruction).

Setwait is taken high via gate 11 if the output of gate 7 is low when NDowait is taken low (i.e. during a Do_Wait instruction).

Figure 14:
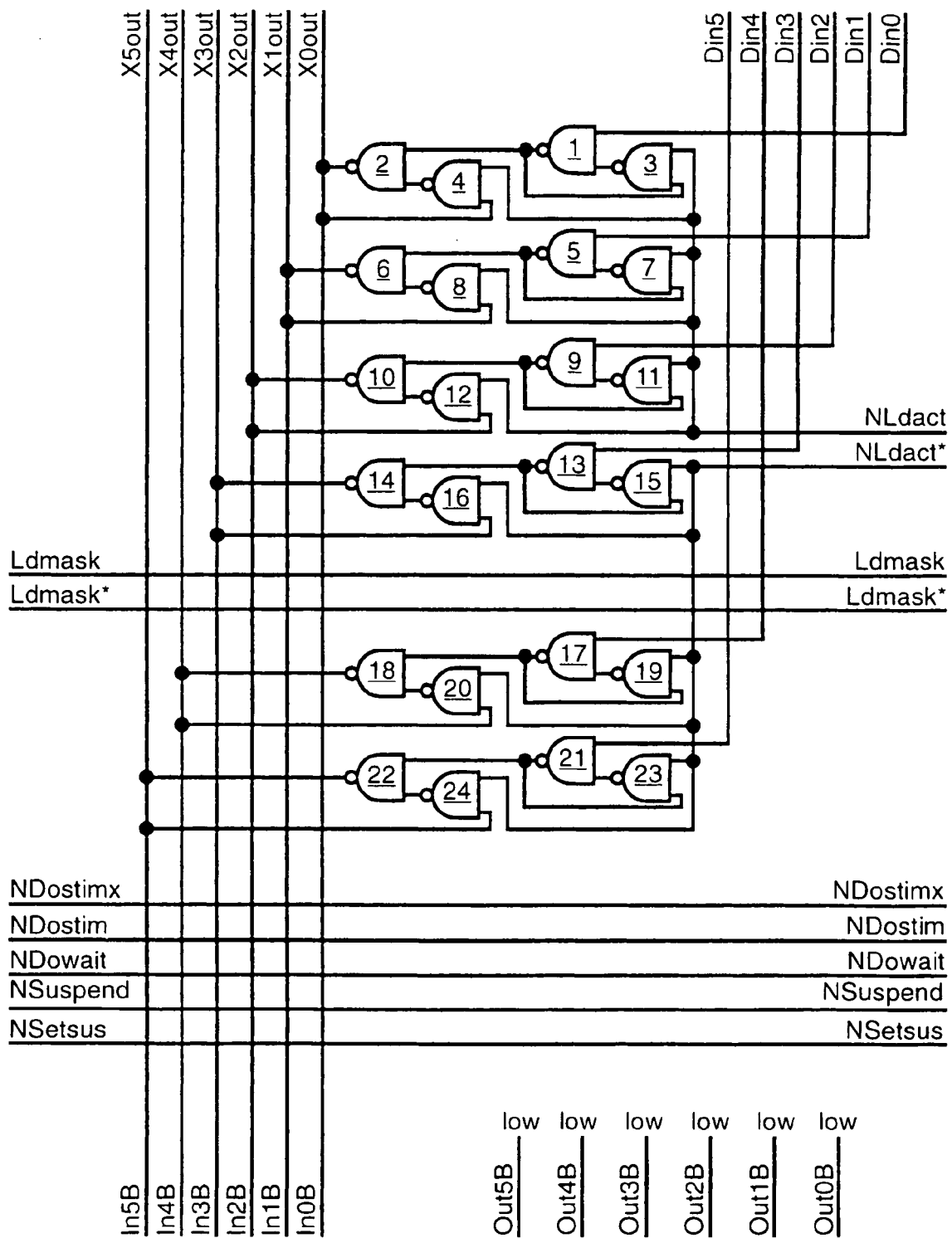

Tile type 'E_top' of FIG. 14 operates to remember the activity number specified in the most recent Load_Activity instruction and to initialise the distributed activity number encoding logic.

Outputs:
In5B/X5out to Tile_E below and to BUTLER I/O output
In4B/X4out to Tile_E below and to BUTLER I/O output
In3B/X3out to Tile_E below and to BUTLER I/O output
In2B/X2out to Tile_E below and to BUTLER I/O output
In1B/X1out to Tile_E below and to BUTLER I/O output and to Tile_Atop
In0B/X0out to Tile_E below and to BUTLER I/O output and to Tile_Atop
Out5B to Tile_E below
Out4B to Tile_E below
Out3B to Tile_E below
Out2B to Tile_E below
Out1B to Tile_E below
Out0B to Tile_E below Inputs:
Din5 from BUTLER I/O input
Din4 from BUTLER I/O input
Din3 from BUTLER I/O input
Din2 from BUTLER I/O input
Din1 from BUTLER I/O input
Din0 from BUTLER I/O input
NLdact from Tile-Rtop
NLdact* from Tile_Rtop Routes:
Ldmask from Tile_Rtop to Tile_Utop
Ldmask* from Tile_Rtop to Tile_Utop
NDostimx from Tile_Rtop to Tile_Utop
NDostim from Tile_Rtop to Tile_Utop
NDowait from Tile_Rtop to Tile_Utop
NSuspend from Tile_Rtop to Tile_Utop
NSetsus from Tile_Rtop to Tile_Utop NLdmask and NLdmask* are functionally the same signal but are physically duplicated to limit loading. Similarly for Ldact and Ldact*.

Gates 1 through 24 form six tlatches. The six tlatches are used to remember the activity number specified (on Din5, Din4, Din3, Din2, Din1 and Din0) in the most recent Load_Activity instruction. The six tlatches are transparent (updated) only when NLdact and NLdact* are low (i.e. during a Load_Activity instruction).

Out5B, Out4B, Out3B, Out2B, Out1B and Out0B are hardwired low.

Figure 15:
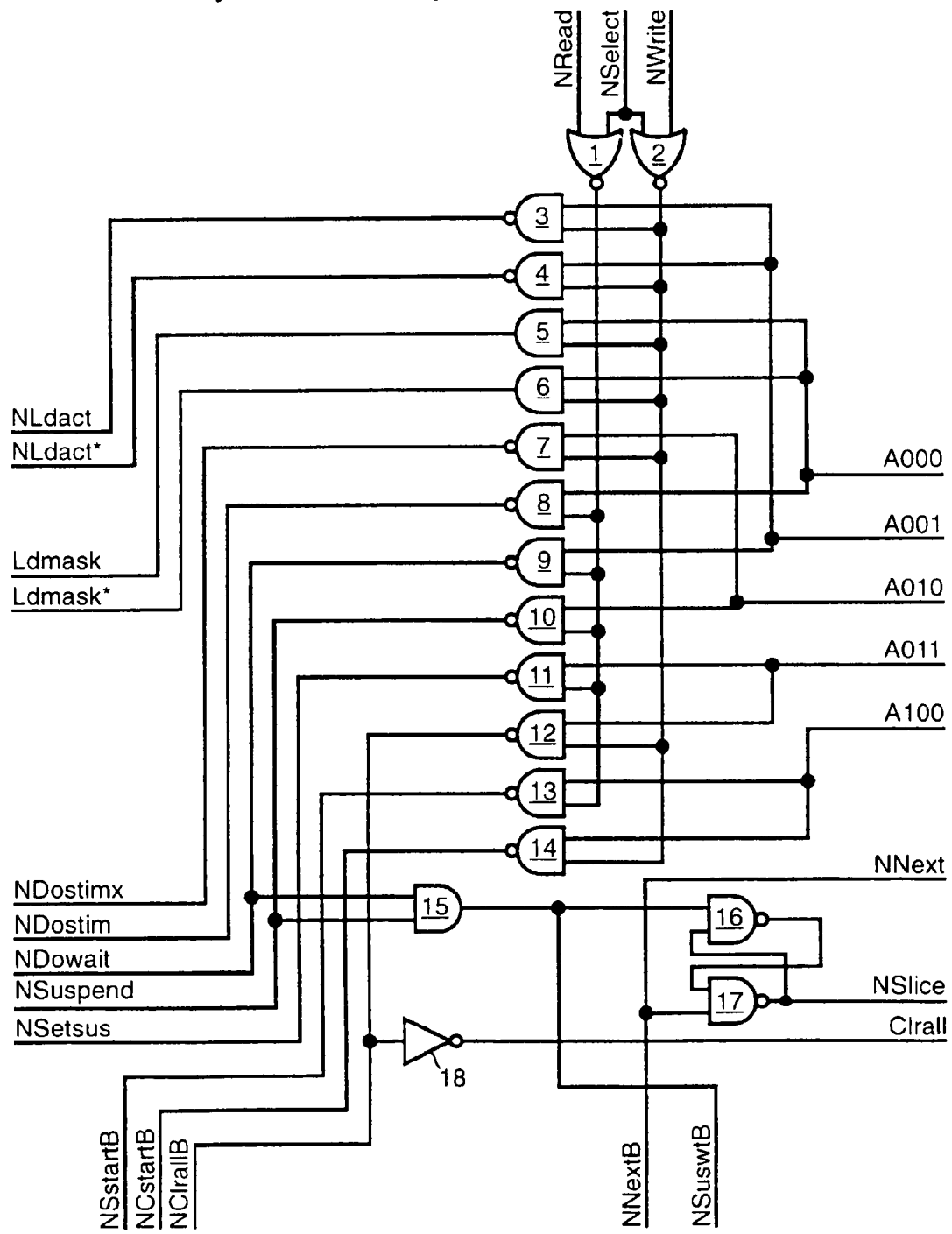

The function of tile type 'R-top' shown in FIG. 15 is to generate array-operation pulses when the CPU is reading from, or writing to the "Butler chip", and to identify when a context switch is in progress.

Outputs:
Ldmask to Tile_Etop
Ldmask* to Tile_Etop
NLdact to Tile_Etop
NLdact* to Tile_Etop
NDostimx to Tile_Etop
NDostim to Tile_Etop
NDowait to Tile_Etop
NSuspend to Tile_Etop
Nsetsus to Tile_Etop
NSlice to Tile_Mtop
Clrall to Tile_Mtop
NSstartB to Tile_R below
NCstartB to Tile_R below
NClrallB to Tile_R below
NSuswtB to Tile_R below Inputs:
NRead from BUTLER I/O input
NSelect from BUTLER I/O input
NWrite from BUTLER I/O input
A000 from Tile_Mtop
A001 from Tile_Mtop
A010 from Tile_Mtop
A011 from Tile_Mtop
A100 from Tile_Mtop
NNext from Tile_Mtop Routes:
NNext/NNextB from Tile_Mtop to Tile_R below The output from gate 1 is taken high when NRead and NSelect are taken low (i.e. when the CPU is reading from the "Butler chip".

The output from gate 2 is taken high when NWrite and NSelect are taken low (i.e. when the CPU is writing to the "Butler chip").

Ldmask is taken high via gate 5 if A000 is high when the output from gate 2 is taken high (i.e. when the CPU is writing to address 000).

Ldmask* is taken high via gate 6 if A000 is high when the output from gate 2 is taken high (i.e. when the CPU is writing to address 000). (NLdmask and NLdmask* are functionally the same signal but are physically duplicated to limit loading.)

NLdact is taken low via gate 3 if A001 is high when the output from gate 2 is taken high (i.e. when the CPU is writing to address 001).

NLdact* is taken low via gate 4 if A001 is high when the output from gate 2 is taken high (i.e. when the CPU is writing to the address 001). (NLdact and NLdact* are functionally the same signal but are physically duplicated to limit loading.)

NDostimx is taken low via gate 7 if A010 is high when the output from gate 2 is taken high (i.e. when the CPU is writing to address 010).

NDostim is taken low via gate 8 if A000 is high when the output from gate 1 is taken high (i.e. when the CPU is reading from address 000).

NDowait is taken low via gate 9 if A001 is high when the output from gate 1 is taken high (i.e. when the CPU is reading from address 001).

NSuspend is taken low via gate 10 if A010 is high when the output from gate 1 is taken high (i.e. when the CPU is reading from address 010).

NSetsus is taken low via gate 11 if A011 is high when the output from gate 1 is taken high (i.e. when the CPU is reading from address 011).

NSstartB is taken low via gate 13 if A100 is high when the output from gate 1 is taken high (i.e. when the CPU is writing to address 100).

NCstartB is taken low via gate 14 if A100 is high when the output from gate 2 is taken high (i.e. when the CPU is reading from address 100).

NClrallB is taken low via gate 12 if A011 is high when the output from gate 2 is taken high (i.e. when the CPU is writing to address 011).

SuswaitB is taken high via gate 15 if either NDowait or NSuspend are low (i.e. during a Do_Wait or a Suspend instruction).

Cross-coupled gates 16 and 17 form a srlatch. This 'Switching' latch is set via gate 15 when either NDowait or NSuspend is low (i.e. during a Dowait or Suspend instruction). The 'Switching' latch is reset when NNext is low. (NNext is taken low during nextact). Concurrent set and reset of the 'Switching' latch cannot occur, because NDowait, NSuspend and NNext are taken low only while executing different instructions. NSlice will be low when the 'Switching' latch is set.

Clrall is taken high via gate 18 whenever NClrallB is taken low (i.e. when the CPU is writing to address 011).

Figure 16:
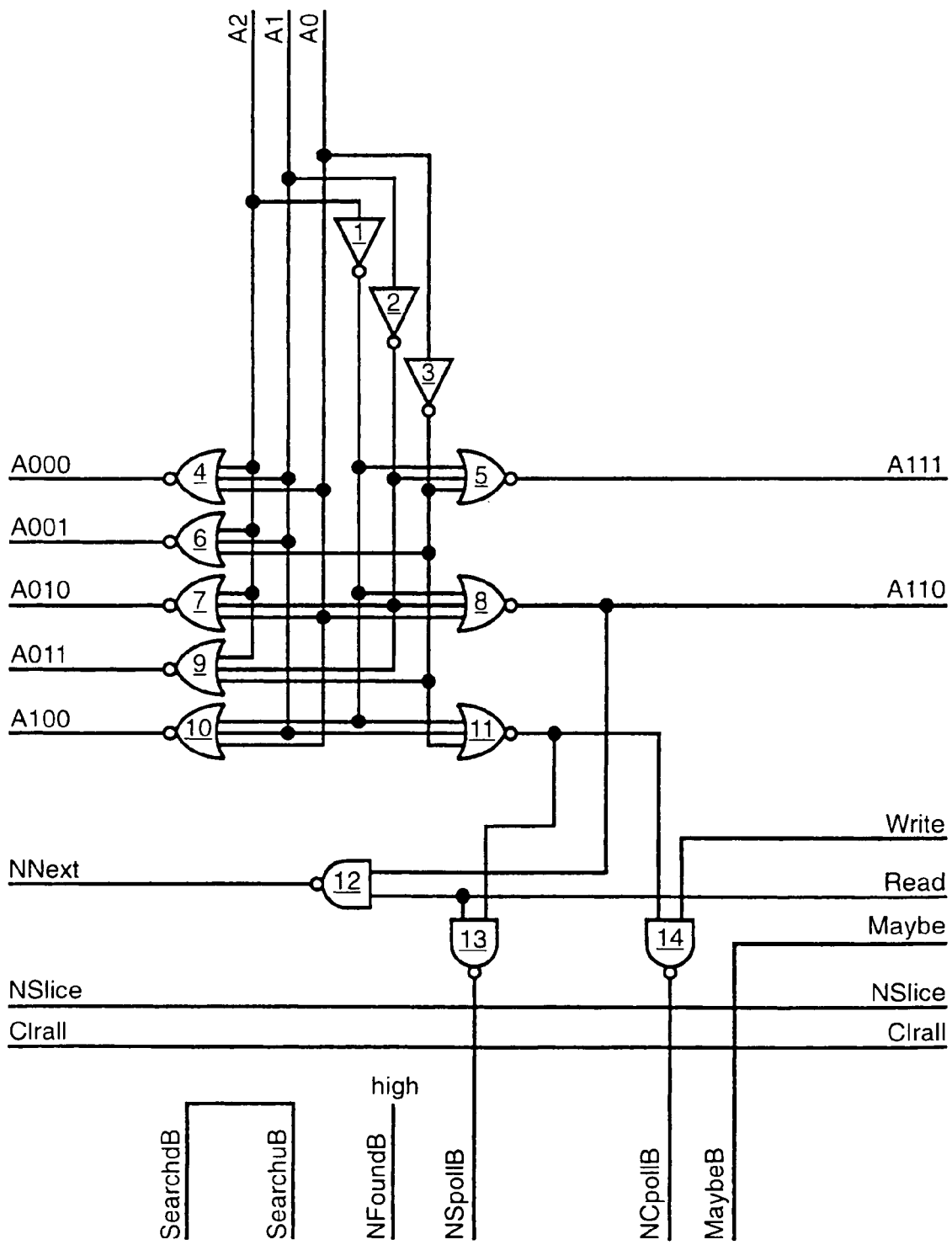

Tile type 'M-top' is shown in FIG. 16. Its functions are to decode the three input address lines A2, A1 and A0, to generate a setpollend array-operation pulse during a Set_Pollend instruction, to generate a clrpollend array-operation pulse during a Clear_Pollend instruction and to initialise the next activity search logic chain.

Output:
　A000 to Tile_Rtop
　A001 to Tile_Rtop
　A010 to Tile_Rtop
　A011 to Tile_Rtop
　A100 to Tile_Rtop
　A110 to Tile_Atop
　A111 to Tile_Atop
　NNext to Tile_Rtop
　NSpollB to Tile_M below
　NCpollB to Tile_M below
　NFoundB to Tile_M below Inputs:
　A2 from BUTLER I/O input
　A1 from BUTLER I/O input
　A0 from BUTLER I/O input
　Read from Tile_Atop
　Write from Tile_Atop Routes:
　NSlice from Tile_Rtop to Tile_Atop
　Clrall from Tile_Rtop to Tile_Atop
　SearchuB/SearchdBfrom Tile_M below to Tile_M below
　MaybeB/Maybe from Tile_M below to Tile_Atop Operation:
　A000 is established high when A2 is low, A1 is low and A0 is low, via gate 4.
　A001 is established high when A2 is low, A1 is low and A0 is high, via gates 3 and 6.
　A010 is established high when A2 is low, A1 is high and A0 is low, via gates 2 and 7.
　A011 is established high when A2 is low, A1 is high and A0 is high, via gates 2, 3 and 9.
　A100 is established high when A2 is high, A1 is low and A0 is low, via gates 1 and 10.
　A101 is established high when A2 is high, A1 is low and A0 is high, via gates 1, 3 and 11.
　A110 is established high when A2 is high, A1 is high and A0 is low, via gates 1, 2 and 8.
　A111 is established high when A2 is high, A1 is high and A0 is high, via gates 1, 2, 3 and 5.
　NNext is taken low via gate 12 if A110 is high when Read is taken high (i.e. when the CPU is reading from address 110).
　NSpollB is taken low via gate 13 if A101 is high when Read is taken high (i.e. when the CPU is reading from address 101).
　NCpollB is taken low via gate 14 if A101 is high when Write is taken high (i.e. when the CPU is writing to address 101).
　NFoundB is hardwired low.

Figure 17:
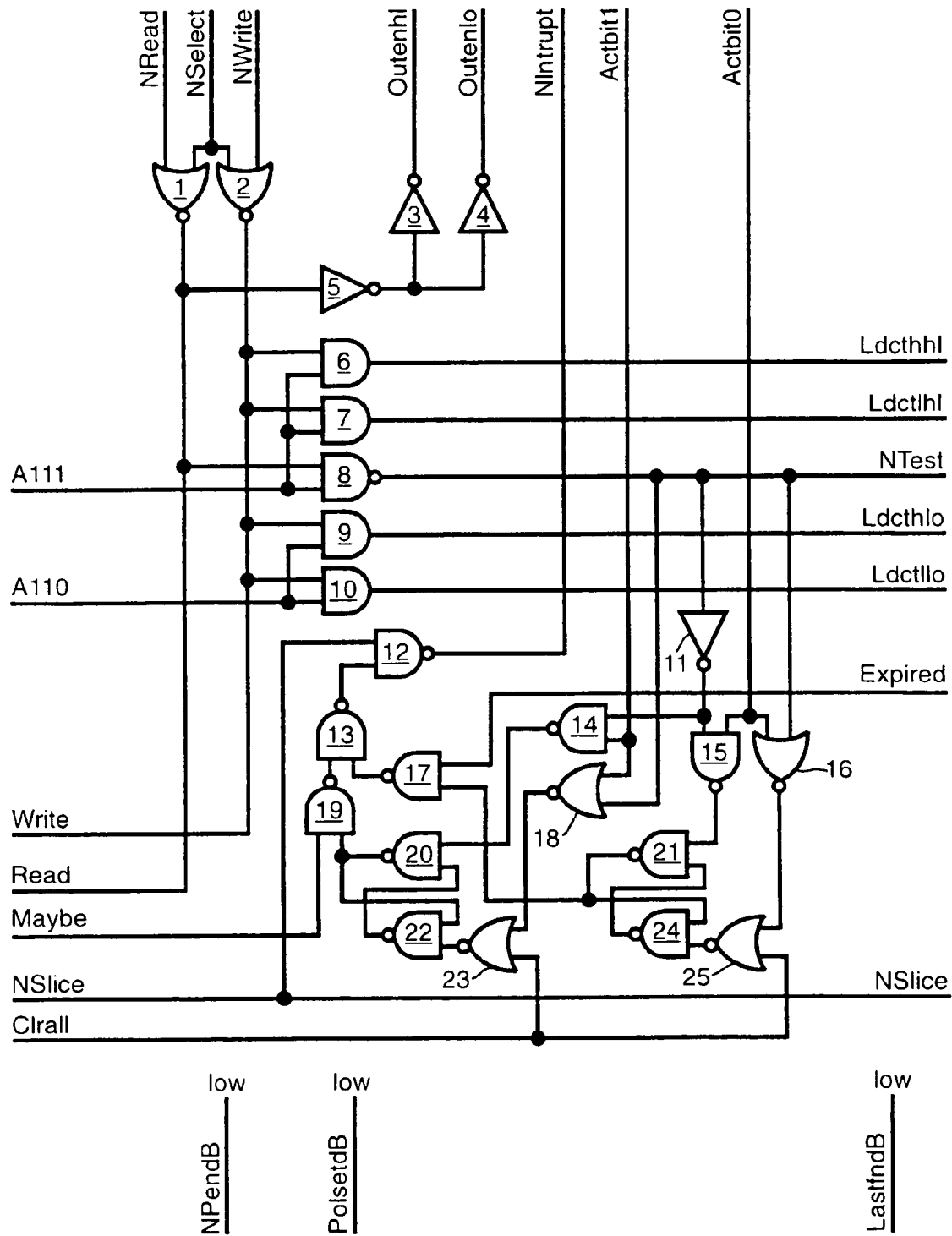

FIG. 17 shows tile type 'A-top'. This tile has the following functions: To control the interrupt line to the CPU; to generate output-enable signals for the bidirectional I/O's (that form the data bus interface to the CPU) when the CPU is reading from the "Butler chip"; to initialise the pollset boundary and 'Last' latch search logic chains.

Outputs:
　Ldcthhi to Tile_Ntop
　Ldctlhi to Tile_Ntop
　Ldcthlo to Tile_Ntop
　Ldctllo to Tile_Ntop
　NTest to Tile_Ntop
　Read to Tile_Mtop
　Write to Tile_Mtop
　Outenhi to BUTLER I/O bidirectional output-enables
　Outenlo to BUTLER I/O bidirectional output-enables
　NIntrupt to BUTLER I/O output
　NPendB to Tile_A below
　PolsetdB to Tile_A below
　LastfndB to Tile_A below Inputs:
　NRead from BUTLER I/O input
　NSelect from BUTLER I/O input
　NWrite from BUTLER I/O input
　Actbit0 from Tile_Etop and BUTLER I/O output
　Actbit1 from Tile_Etop and BUTLER I/O output
　A111 from Tile_Mtop
　A110 from Tile_Mtop
　NSlice from Tile_Mtop
　Clrall from Tile_Mtop
　Maybe from Tile_Mtop
　Expired from Tile_Ntop Routes:
　NSlice from Tile_Mtop to Tile_Ntop Operation:
　Read is taken high via gate 1 when NRead and NSelect are taken low (i.e. when the CPU is reading from the "Butler chip".
　Write is taken high via gate 2 when NWrite and NSelect are taken low (i.e. when the CPU is writing to the "Butler chip".
　Outenhi and Outenlo are established high via gates 3, 4 and 5 when Read is high. (Read is taken high when the CPU is reading from the "Butler chip").
　Ldcthhi is taken high via gate 6 if A111 is high when Write is taken high (ie when the CPU is writing to address 111).
　Ldctlhi is taken high via gate 7 if A111 is high when Write is taken high (ie when the CPU is writing from address 111).
　NTest is taken low via gate 8 if A111 is high when Read is taken high (ie when the CPU is reading from address 111).
　Ldcthlo is taken low via gate 9 if A110 is high when Write is taken high (ie when the CPU is writing to address 110).
　Ldctllo is taken low via gate 10 if A110 is high when Write is taken high (ie when the CPU is writing to address 110).

Cross-coupled gates 21 and 24 form a srlatch. This 'Enable counter interrupt' latch is set via gates 11 and 15 when NTest is low and Actbit0 is high. (NTest is taken low during a Control_Interrupts instruction; Actbit0 is bit0 of the activity number specified in the most recent Load_Activity instruction.) The 'Enable counter interrupt' latch is reset when Clrall is high via gate 25, or when NTest and Actbit0 are low via gates 16 and 25. (Clrall is taken high during clrall). Concurrent set and reset of the 'Enable counter interrupt' latch cannot occur, because NTest is taken low and Clrall is taken high, only while executing different instructions.

Cross-coupled gates 20 and 22 form a srlatch. This 'Enable pre-emption interrupt' latch is set via gates 11 and 14 when NTest is low and Actbit1 is high. (NTest is taken low during a Control_Interrupts instruction; Actbit1 is bit1 of the activity number specified in the most recent Load_Activity instruction.) The 'Enable pre-emption interrupt' latch is reset when Clrall is high via gate 23, or when NTest and Actbit1 are low via gates 18 and 23. (Clrall is taken high during clrall.) Concurrent set and reset of the 'Enable counter interrupt' latch cannot occur, because NTest is taken low and Clrall is taken high, only while executing different instructions.

NIntrupt will be established low via gates 12, 13 and 17 when the 'Enable counter interrupt' latch is set and Expired and NSlice are high. (Expired will be high when the counter has reached its limit. NSlice will be high between context switches, i.e. between a Nextact instruction and a subsequent Suspend or a Do_Wait instruction.)

NIntrupt will be established low via gates 12, 13 and 19 when the 'Enable pre-emption interrupt' latch is set and Maybe and NSlice are high. (Maybe will be high when there is a candidate for scheduling that has a higher priority than the activity currently running on the CPU. NSlice will be high between context switches, i.e. between a Nextact instruction and a subsequent Suspend or a Do_Wait instruction.)

NIntrupt will be established high via gate 12 when NSlice is low. (NSlice will be low during a context switch, i.e between a Suspend or a Do_Wait instruction and a subsequent Nextact instruction.)

NPendB, PolsetdB and LastfndB are hardwired low.

Figure 18:
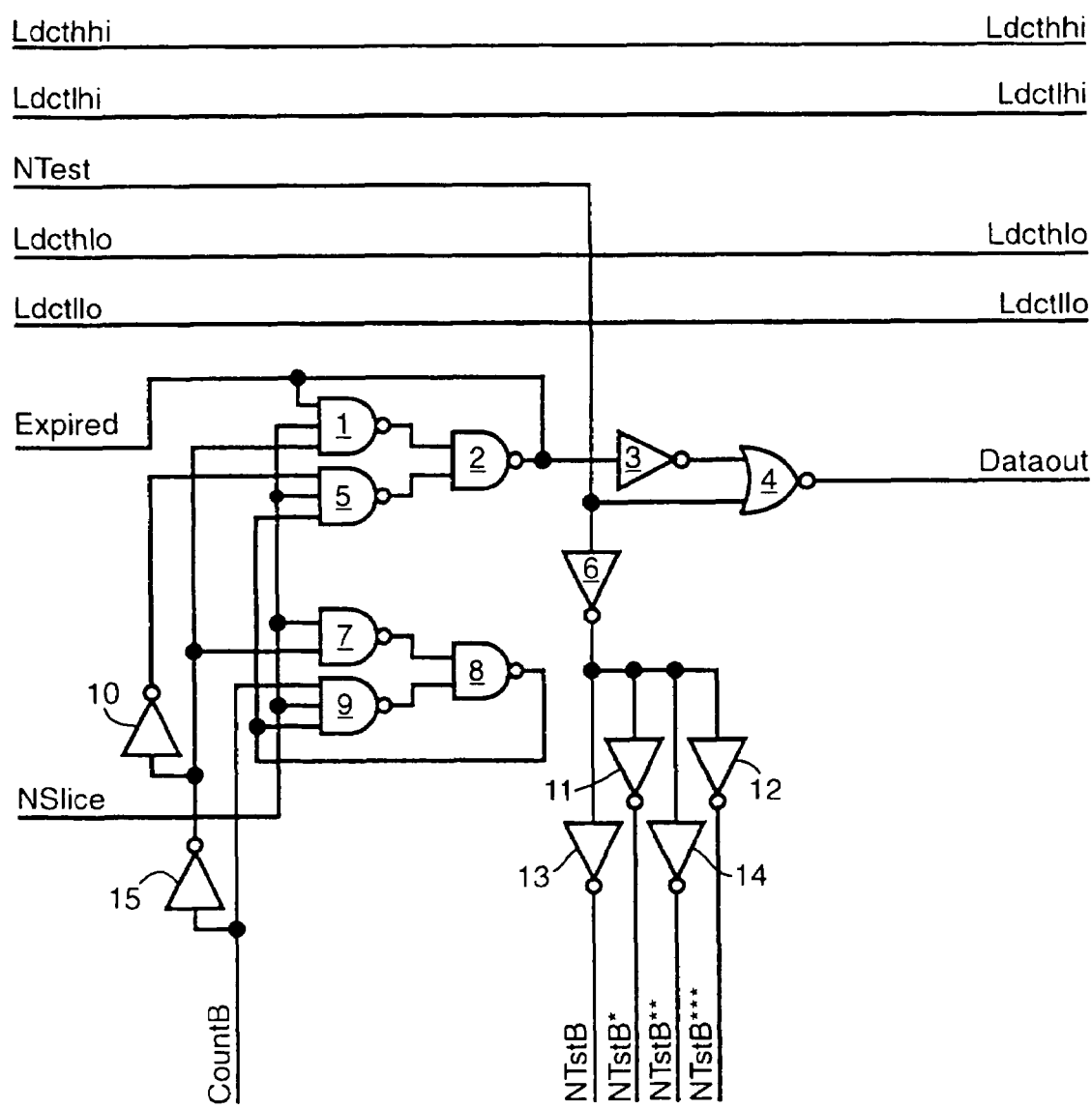

FIG. 18 shows tile type 'N-top' whose function is to indicate when the counter has received a specified number (plus one) of its transitions on its counter input line.
Outputs:
  Expired to Tile_Atop
  Dataout to BUTLER I/O bidirectional output
  NTstB to Tile_N below
  NTstB* to Tile_N below
  NTstB** to Tile_N below
  NTstB*** to Tile_N below
Inputs:
  NTest from Tile_Atop
  NSlice from Tile_Atop
  CountB from Tile_N below
Routes:
  Ldcthhi from Tile_Atop to Array_right_Ntop
  Ldctlhi from Tile_Atop to Array_right_Ntop
  Ldcthlo from Tile_Atop to Array_right_Ntop
  Ldctllo from Tile_Atop to Array_right_Ntop
  Ldcthhi, Ldctlhi, Ldcthlo and Ldctllo from array_right_Ntop each drive eight of the thirty-two $N_{13}$ tile's Ldctr inputs The value on NTest is transmitted to NTstB, NTstB*, NTstB and NTstB* are functionally the same signal but are physically duplicated to limit loading.

Gates 1, 2, 5 and 10, and gates 7, 8, 9 and 10 form a pair of tlatches. When one is transparent the other is latched, the way round determined by the value on CountB. The output from the first tlatch (gate 8) is connected to the input of the second (gate 5). When NSlice is high this arrangement of gates implements a transition latch. Expired, if already low, will be established high when CountB changes from a low to a high.

When NSlice is low the transition latch is initialised and Expired is established low. (NSlice will be low during a context switch i.e. between a Suspend or a Do_Wait instruction and a subsequent Nextact instruction.)

Dataout will be established to the transition latch value (Expired) via gates 3 and 4 when NTest is low. (NTest is taken low during an Control_Interrupts instruction.)

Dataout is established low via gate 4 when NTest is high.

The asynchronous "Butler chip" circuitry is inherently testable and so no additional internal test logic is necessary. (Internal scan paths would be inappropriate because there are no clocked latches.)

Boundary scan I/O cells can be incorporated in a "Butler chip" that are to be used on boards that rely on boundary scan techniques for in-circuit testing.

During a "Butler chip" component test, all I/O's can be driven or monitored by a single tester, therefore no effects from asynchronous inputs can occur. The tester can be arranged to use a specific sequential set of test vectors, with each test vector defining a test cycle. In this case, an input test pattern is applied to all inputs at the beginning of each cycle and any outputs are monitored at the end of the cycle. Each test vector has one entry for each I/O, plus one entry to indicate to the tester whether the bidirectional data lines are to be driven or monitored for this cycle. An entry comprises either a 1 or 0 to represent a high or low value, or an X when monitoring an undefined don't-care output state.

Test vectors that execute a read instruction (i.e. with I/O inputs NSelect and NRead low) invoke a "Butler chip" operation and monitor the result from the next activity selection logic in the same cycle. Thus both the setting of, and the effect of setting any of the "Stimmed", "Waiting", "Suspended", "Started" and "Pollend" variables can be observed at the outputs in one cycle (on data lines D6–D0).

Intermediate stages of the ripple down-counter are put onto the most significant nine bits (D15–D7) of the data bus during a Control_Interrupts read instruction. Valid data is returned during test because the tester can only provide counter input transitions at the start of a test cycle, and sufficient time is available for the ripple counter logic to stabilise by the end of the cycle. (During normal operation valid data is not guaranteed because the counter input may be derived from an asynchronous source.)

The test vectors can be applied at any rate up to a maximum determined by the time for the next activity selection logic to stabilise. They will confirm that the manufactured device conforms logically to the design. Formal mathematical analysis can be used to verify a correct design.

What is claimed is:

1. An integrated circuit for use as a scheduler of activities to be run on an associated processor, said circuit comprised of: a modular design comprised of an assembly of design tiles, wherein each tile defines a building block having logic and connections, said tiles interconnected to form a two-dimensional array of n rows and m columns which realizes an overall functionality for the integrated circuit, wherein each of the n rows of tiles includes a series of stim-wait circuits and provides the control logic for one of n schedulable activities and each of the m columns of tiles is arranged to operate one of said stim-wait circuits to a stim condition.

2. An integrated circuit as claimed in claim 1 comprising a further row of tiles for interfacing with said associated processor and for generating control signals for said two-dimensional array.

3. An integrated circuit as claimed in claim 1 in which the control logic includes means for holding control variables corresponding to each of said activities and next-activity selection logic for identifying those activities which are ready for running on the processor, depending on the status of said control variables.

4. An integrated circuit as claimed in claim 3 in which the control variables include at least one "stim-wait" channel.

5. An integrated circuit as claimed in claim 3 including means for setting the control variables comprising a "stim-wait" channel in response to a signal received from an associated processor.

6. An integrated circuit as claimed in claim 3 including means for setting the control variables comprising a "stim-wait" channel in response to a signal received from an associated peripheral device.

7. An integrated circuit as claimed in claim 3 including means for setting the control variables comprising a stim-wait channel in response to a signal received from a second integrated circuit.

8. An integrated circuit as claimed in claim 3 including means for temporarily inhibiting any changes to the control variables from entering the next-activity-selection logic.

9. An integrated circuit as claimed in claim 3 in which the next-activity selection logic includes means for selecting, from said activities which are ready for running, said next activity to be run on a round robin basis.

10. An integrated circuit as claimed in claim 3 in which said next activity selection logic includes means for allocating differing priority levels to groups of activities, and for selecting from said activities which are ready for running the next activity to run within a group on a round robin basis within that group.

11. An integrated circuit as claimed in claim 1 and incorporating decoding and encoding logic for routing signals, identifying one or more of said n activities, between the associated processor and the appropriate row of tiles.

12. An integrated circuit as claimed in claim 1 including means for detecting when a schedulable activity has a higher priority than that activity currently running on an associated processor and thereby generating an interrupt signal.

13. An integrated circuit as claimed in claim 1 incorporating a counter circuit.

14. An integrated circuit as claimed in claim 1 configured for asynchronous operation by incorporating level driven, clock-free ripple logic.

15. An integrated circuit as claimed in claim 1 fabricated using CMOS techniques.

16. A processing network responsive to an integrated circuit as claimed in claim 1.

17. A processing network, as claimed in claim 16, further comprising at least one peripheral device for setting at least one control variable in said integrated circuit.

18. An activity scheduler arranged to control activities in a processor, comprising:
an integrated circuit to support shared data and multi-tasking for the processor,
the integrated circuit comprising a set of stim-wait circuits for each activity,
each stim-wait circuit responsive to a wait signal and a stim signal to identify when its associated activity is ready to run, and
the integrated circuit further incorporating next activity logic to select, from the activities that are ready to run, the next activity to be run on the processor.

19. A processing network comprising at least one processor for controlling an activity scheduler as in claim 18.

20. A processing network, as claimed in claim 19, further comprising at least one peripheral device for setting at least one control variable in said integrated circuit.

21. A multiprocessor network comprising a plurality of processors, each responsive to an activity scheduler as claimed in claim 18, wherein the activity schedulers are operatively linked together.

22. An activity scheduler, as claimed in claim 18, incorporating decoding and encoding logic to identify one or more of said activities and to route signals from said activity scheduler to the appropriate stim-wait circuit.

23. An activity scheduler, as claimed in claim 18, including activity selection means operable to select the next activity on a round robin basis.

24. An activity scheduler, as claimed in claim 18, including priority selection means to allocate different priorities to groups of activities and to select the next of said activities within a group on a round robin basis within that group.

25. An activity scheduler, as claimed in claim 18, including a priority detector to detect an activity having a priority higher that the priority of the activity currently executing on one of said processors, the priority detector being arranged to generate an interrupt signal to interrupt processing of the lower priority activity in favour of the higher priority activity.

26. An activity scheduler, as claimed in claim 18, in which the control variables are Boolean.

27. An activity scheduler arranged to control activities in a plurality of processors, comprising:
a separate integrated circuit to support shared data and multi-tasking for each of said processors,
each integrated circuit comprising a set of stim-wait circuits for each activity,
each stim-wait circuit responsive to a wait signal and a stim signal to identify when its associated activity is ready to run, and
each of said separate integrated circuits further incorporating next activity logic to select the activity that should execute next, from the set of activities that are ready to run on the associated processor.

28. A processing network comprising at least one processor arranged to be controlled by an activity scheduler as claimed in claim 27.

29. A processing network, as claimed in claim 28, further comprising at least one peripheral device for setting at least one control variable in said integrated circuit.

30. An activity scheduler, arranged to support shared data and multi-tasking in a network of processors, comprising:
a separate circuit to support shared data and multi-tasking in each of said processors,
each circuit being configured to provide a control node mechanism comprising stim-wait circuits for each activity on an associated processor,
each stim-wait circuit incorporating holding means to hold a pair of control variables for one of said activities, and
each of said separate circuits further incorporating next activity logic to select the activity that should execute next, from the set of activities that are ready to run on the associated processor.

31. An activity scheduler, as claimed in claim 30, in which at least one of said processors is arranged to set at least one control variable in one of said separate circuits.

32. An activity scheduler, as claimed in claim 30, including a peripheral device arranged to set at least one control variable in one of said separate circuits.

33. An activity scheduler, as claimed in claim 30, in which at least one of said separate circuits is arranged to set at least one control variable in another of said separate circuits.

34. An activity scheduler, as claimed in claim 30, in which at least one control node mechanism has its set of stim-wait circuits arranged as an array comprising n rows and m columns, and at least one of said separate circuits is configured to support said array of control node mechanisms.

35. An activity scheduler, as claimed in claim 30, in which the control variables are Boolean.

36. An activity scheduler, as claimed in claim 30, including inhibitor means operable to inhibit any changes to control variables from entering the next activity logic.

37. A method of controlling activities in a processor comprising holding pairs of control variables as stim-wait channels corresponding to such activities, updating said control variables dynamically as said activities execute and interact, and selecting the next activity to be run on the processor dependant on the states of said stim-wait channels as activities execute and interact.

38. A method of controlling activities in a plurality of processors comprising holding pairs of control variables as stim-wait channels corresponding to such activities, updating said control variables dynamically as said activities execute and interact in each processor, and selecting the next activity to run on each processor dependant on the changing states of said stim-wait channels as activities execute and interact.

39. An integrated circuit, for use as a scheduler of activities to be run on an associated processor, said circuit comprising a modular design comprised of an assembly of design tiles, wherein each tile defines a building block having logic and connections, said tiles interconnected to form a two-dimensional array which realizes an overall functionality for the integrated circuit, said array including n rows and m columns wherein each of the n rows of tiles includes a series of stim-wait circuits and provides control logic for one of n schedulable activities, and each of the m columns of tiles is arranged to operate any of the stim-wait circuits in that column to a stimmed condition.

40. An integrated circuit, as claimed in claim 39, comprising a further row of tiles for interfacing between said two-dimensional array and said associated processor and for transmitting control signals from said associated processor to said two-dimensional array.

41. An integrated circuit, as claimed in claim 39, in which the control logic additionally includes means for holding a set of control variables corresponding to each of said activities, and next-activity selection logic for identifying those activities which are ready for running on said associated processor, depending on the status of said control variables.

42. An integrated circuit, as claimed in claim 41, in which said means for holding the set of control variables comprises a stim-wait circuit operable into said stimmed condition or into a waiting condition in response to a signal initiated by an activity running on said associated processor.

43. An integrated circuit, as claimed in claim 41, in which said means for holding the set of control variables comprises a stim-wait circuit operable to its said stimmed condition in response to a signal received from an associated peripheral device.

44. An integrated circuit, as claimed in claim 41, in which said means for holding the set of control variables comprises a stim-wait circuit operable to its said stimmed condition in response to a signal received from a second integrated circuit.

45. An integrated circuit, as claimed in claim 41, including means for temporarily inhibiting any asynchronous changes to said control variables from entering the next-activity selection logic.

46. An integrated circuit as claimed in claim 41 in which the next-activity selection logic includes means for selecting, from said activities which are ready for running, said next activity to be run on a round robin basis.

47. An integrated circuit as claimed in claim 41 in which said next activity selection logic includes means for allocating differing priority levels to groups of activities, and for selecting from said activities which are ready for running said next activity to run within a group on a round robin basis within that group.

48. An integrated circuit, as claimed in claim 39, in which each stim-wait circuit is arranged to hold two single-bit control variables 'stim' and 'wait' whose output 'ready' is true when both of said held control variables are true.

49. An integrated circuit, as claimed in claim 39 incorporating decoding and encoding logic for routing signals, identifying one or more of said n activities, between said associated processor and the appropriate row of tiles.

50. An integrated circuit as claimed in claim 39 including means for detecting when a schedulable activity has a higher priority than that activity currently running on an associated processor and thereby generating an interrupt signal.

51. An integrated circuit as claimed in claim 39 incorporating a counter circuit.

52. An integrated circuit as claimed in claim 39 configured for asynchronous operation by incorporating level driven, clock-free ripple logic.

53. An integrated circuit as claimed in claim 39 fabricated using CMOS techniques.

* * * * *